US012233896B2

(12) United States Patent
Yasui et al.

(10) Patent No.: US 12,233,896 B2
(45) Date of Patent: Feb. 25, 2025

(54) DRIVING ASSISTANCE DEVICE AND DRIVING ASSISTANCE METHOD

(71) Applicant: HONDA MOTOR CO., LTD., Tokyo (JP)

(72) Inventors: Yuji Yasui, Wako (JP); Aya Miura, Wako (JP); Ken Iinuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 17/964,072

(22) Filed: Oct. 12, 2022

(65) Prior Publication Data

US 2023/0119748 A1   Apr. 20, 2023

(30) Foreign Application Priority Data

Oct. 14, 2021   (JP) .................................. 2021-168834

(51) Int. Cl.
*B60W 50/14*   (2020.01)
*B60W 40/107*   (2012.01)

(52) U.S. Cl.
CPC .......... *B60W 50/14* (2013.01); *B60W 40/107* (2013.01); *B60W 2520/105* (2013.01); *B60W 2554/4041* (2020.02)

(58) Field of Classification Search
CPC ............... B60W 50/14; B60W 40/107; B60W 2554/4041; B60W 2520/105
See application file for complete search history.

(56) References Cited

U.S. PATENT DOCUMENTS

| | | | |
|---|---|---|---|
| 5,450,057 A | 9/1995 | Watanabe | |
| 2013/0038435 A1 | 2/2013 | Muroya | |
| 2022/0063618 A1* | 3/2022 | Yasui | ................. B60W 40/105 |

FOREIGN PATENT DOCUMENTS

| | | |
|---|---|---|
| JP | 05-126948 | 5/1993 |
| JP | 2005-053401 | 3/2005 |
| JP | 2006-199264 | 8/2006 |
| JP | 2006-244142 | 9/2006 |
| JP | 2007-133486 | 5/2007 |
| JP | 2013-015969 | 1/2013 |
| WO | 2012/070334 | 5/2012 |

OTHER PUBLICATIONS

Japanese Office Action for Japanese Patent Application No. 2021-168834 mailed May 21, 2024.

* cited by examiner

*Primary Examiner* — Michael D Lang
(74) *Attorney, Agent, or Firm* — Amin, Turocy & Watson, LLP

(57) ABSTRACT

A driving assistance device includes a storage device configured to store a program and a processor connected to the storage device. The processor executes the program stored in the storage device to acquire information about a target position decided on as a position relative to another moving object located in a second lane when a host moving object merges or changes lanes from a first lane to the second lane and cause a speaker to output a sound obtained by combining a basic sound for acceleration guidance with an additional sound for the acceleration guidance having a higher frequency than the basic sound for the acceleration guidance when the host moving object should accelerate such that position alignment related to a traveling direction of the host moving object is performed with respect to the target position.

15 Claims, 21 Drawing Sheets

FIG. 4

| | INTER-VEHICLE RELATIONSHIP | VELOCITY RELATIONSHIP | NECESSARY DRIVING OPERATION |
|---|---|---|---|
| CASE 5 | | $Ve \fallingdotseq Vof, Vob$ | |
| CASE 6 | | $Ve \fallingdotseq Vof, Vob$ | |
| CASE 7 | | $Ve \fallingdotseq Vof, Vob$ | |
| CASE 8 | | $Ve \gg Vof, Vob$ | |

DRIVING ASSISTANCE DEVICE AND DRIVING ASSISTANCE METHOD

CROSS-REFERENCE TO RELATED APPLICATION

Priority is claimed on Japanese Patent Application No. 2021-168834, filed Oct. 14, 2021, the content of which is incorporated herein by reference.

BACKGROUND

Field of the Invention

The present invention relates to a driving assistance device and a driving assistance method.

Description of Related Art

A vehicle using a buzzer to notify that target acceleration/deceleration has reached a limit value when it is determined that the target acceleration/deceleration has reached the limit value is known (Japanese Unexamined Patent Application, First Publication No. 2005-053401). Also, a vehicle that provides a notification of the start of a brake operation with a buzzer sound when a host vehicle has reached a brake operation start point, reduces the buzzer sound as a vehicle velocity decreases, and provides a notification of a velocity difference from a deceleration target according to a volume of the buzzer sound is known (Japanese Unexamined Patent Application, First Publication No. 2007-133486).

SUMMARY

An acceleration/deceleration operation at the time of merging or a lane change to another lane can be a difficult operation for a driver, but providing guidance content that is easy to understand has not been sufficiently investigated.

The present invention has been made in consideration of the above circumstances and an objective of the present invention is to provide a driving assistance device and a driving assistance method capable of providing a driver with guidance content that is easier to understand.

A driving assistance device and a driving assistance method according to the present invention adopt the following configurations.

(1): According to an aspect of the present invention, there is provided a driving assistance device including: a storage device configured to store a program; and a processor connected to the storage device, wherein the processor executes the program stored in the storage device to: acquire information about a target position decided on as a position relative to another moving object located in a second lane when a host moving object merges or changes lanes from a first lane to the second lane; and cause a speaker to output a sound obtained by combining a basic sound for acceleration guidance with an additional sound for the acceleration guidance having a higher frequency than the basic sound for the acceleration guidance when the host moving object should accelerate such that position alignment related to a traveling direction of the host moving object is performed with respect to the target position.

(2): In the above-described aspect (1), the processor causes the speaker to output a sound obtained by combining the basic sound for the acceleration guidance with the additional sound for the acceleration guidance that is an inter-order harmonic sound having a multiple of a frequency of the basic sound for the acceleration guidance.

(3): In the above-described aspect (1), the additional sound for the acceleration guidance includes a plurality of sounds having frequencies different from each other.

(4): In the above-described aspect (2), the processor calculates a degree to which the host moving object should accelerate such that the position alignment related to the traveling direction of the host moving object is performed with respect to the target position, and the number of sounds having frequencies different from each other increases as the degree to which the host moving object should accelerate increases.

(5): In the above-described aspect (1), the processor calculates a degree to which the host moving object should accelerate such that the position alignment related to the traveling direction of the host moving object is performed with respect to the target position, and the processor causes a volume of the additional sound for the acceleration guidance to increase as the degree to which the host moving object should accelerate increases.

(6): In the above-described aspect (1), the processor calculates a degree to which the host moving object should accelerate such that the position alignment related to the traveling direction of the host moving object is performed with respect to the target position, and the processor increases a frequency of the basic sound for the acceleration guidance as the degree to which the host moving object should accelerate increases.

(7): In the above-described aspect (1), the processor causes the speaker to output a sound obtained by combining a basic sound for deceleration guidance with an additional sound for the deceleration guidance having a lower frequency than the basic sound for the deceleration guidance when the host moving object should decelerate such that the position alignment related to the traveling direction of the host moving object is performed with respect to the target position.

(8): In the above-described aspect (7), the processor causes the speaker to output a sound at unequal intervals when the host moving object should accelerate such that the position alignment related to the traveling direction of the host moving object is performed with respect to the target position, and the processor causes the speaker to output a sound at equal intervals when the host moving object should decelerate such that the position alignment related to the traveling direction of the host moving object is performed with respect to the target position.

(9): According to another aspect of the present invention, there is provided a driving assistance device including: a storage device configured to store a program; and a processor connected to the storage device, wherein the processor executes the program stored in the storage device to: acquire information about a target position decided on as a position relative to another moving object located in a second lane when a host moving object merges or changes lanes from a first lane to the second lane; and cause a speaker to output a sound obtained by combining a basic sound for deceleration guidance with an additional sound for the deceleration guidance having a lower frequency than the basic sound for the deceleration guidance when the host moving object should decelerate such that position alignment related to a traveling direction of the host moving object is performed with respect to the target position.

(10): In the above-described aspect (9), the processor causes the speaker to output a sound obtained by combining the basic sound for the deceleration guidance with the additional sound for the deceleration guidance having a frequency different from a frequency that is 1/n times a frequency of the basic sound for the deceleration guidance.

(11): In the above-described aspect (9), the additional sound for the deceleration guidance includes a plurality of sounds having frequencies different from each other.

(12): In the above-described aspect (11), the processor calculates a degree to which the host moving object should decelerate such that the position alignment related to the traveling direction of the host moving object is performed with respect to the target position, and the number of additional sounds for the deceleration guidance having frequencies different from each other increases as the degree to which the host moving object should decelerate increases.

(13): In the above-described aspect (9), the processor calculates a degree to which the host moving object should decelerate such that the position alignment related to the traveling direction of the host moving object is performed with respect to the target position, and the processor causes a volume of the additional sound for the deceleration guidance to increase as the degree to which the host moving object should decelerate increases.

(14): In the above-described aspect (9), the processor calculates a degree to which the host moving object should decelerate such that the position alignment related to the traveling direction of the host moving object is performed with respect to the target position, and the processor causes a frequency of the additional sound for the deceleration guidance to be further from a frequency of the basic sound for the deceleration guidance as the degree to which the host moving object should decelerate increases.

(15): In the above-described aspect (9), the processor calculates a degree to which the host moving object should accelerate such that the position alignment related to the traveling direction of the host moving object is performed with respect to the target position, and the processor lowers a frequency of the basic sound for the deceleration guidance as the degree to which the host moving object should decelerate increases.

(16): According to another aspect of the present invention, there is provided a driving assistance method using a processor, the method including: acquiring information about a target position decided on as a position relative to another moving object located in a second lane when a host moving object merges or changes lanes from a first lane to the second lane; and causing a speaker to output a sound obtained by combining a basic sound for acceleration guidance with an additional sound for the acceleration guidance having a higher frequency than the basic sound for the acceleration guidance when the host moving object should accelerate such that position alignment related to a traveling direction of the host moving object is performed with respect to the target position.

(17): According to yet another aspect of the present invention, there is provided a driving assistance method using a processor, the method including: acquiring information about a target position decided on as a position relative to another moving object located in a second lane when a host moving object merges or changes lanes from a first lane to the second lane; and causing a speaker to output a sound obtained by combining a basic sound for deceleration guidance with an additional sound for the deceleration guidance having a lower frequency than the basic sound for the deceleration guidance when the host moving object should decelerate such that position alignment related to a traveling direction of the host moving object is performed with respect to the target position.

According to the above-described aspects (1) to (17), it is possible to provide a driver with guidance content that is easier to understand.

BRIEF DESCRIPTION OF THE DRAWINGS

FIG. 4 is a diagram showing several situations from other points of view related to the merging.

DESCRIPTION OF EMBODIMENTS

Hereinafter, embodiments of a driving assistance device, a driving assistance method, and a program of the present invention will be described with reference to the drawings. The driving assistance device is a device that supports driving of a moving object. The moving object includes vehicles such as three- or four-wheeled vehicles, two-wheeled vehicles, micromobility, and the like, and may include any moving object into or on which a person (driver) gets and which can move on a road surface with lanes. In the following description, the moving object is assumed to be a four-wheeled vehicle and the vehicle equipped with the driving assistance device is referred to as a vehicle M.

[Overview]

Figure 1:
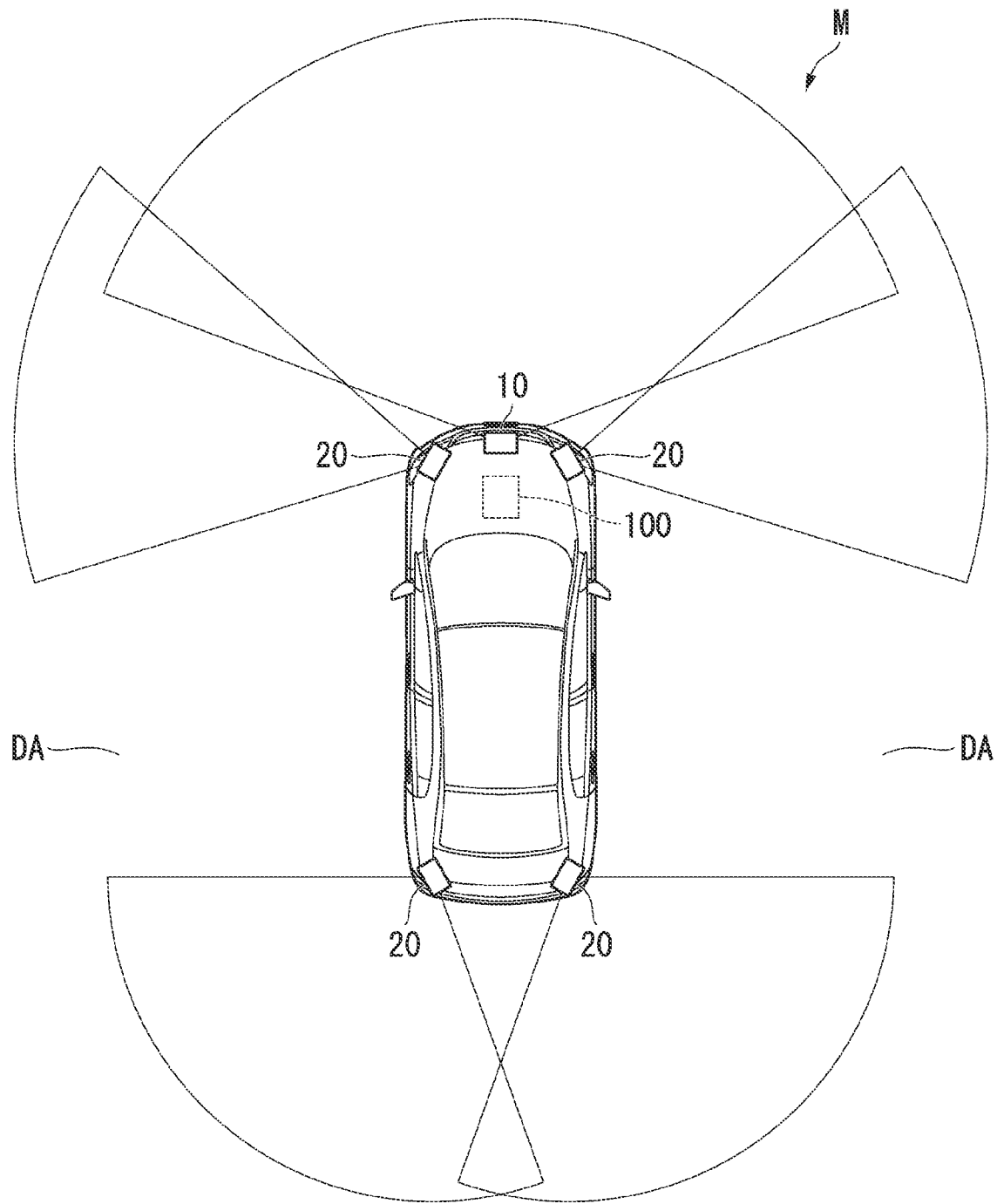
FIG. 1 is a plan view showing a vehicle M equipped with a driving assistance device.

FIG. 1 is a plan view showing the vehicle M equipped with a driving assistance device 100. The vehicle M may be an automobile powered by an internal combustion engine such as a diesel engine or a gasoline engine, an electric vehicle powered by an electric motor, or a hybrid vehicle having both an internal combustion engine and an electric motor. The vehicle M is equipped with, for example, a camera 10, a plurality of radars 20, and the driving assistance device 100.

The camera 10 is provided, for example, in the front part of the vehicle M, and can image the view in front of the vehicle M. An imaging range of the camera 10 shown in FIG. 1 is conceptual. The camera 10 can image other vehicles traveling relatively far ahead compared to the radar 20. The radars 20 are provided, for example, on four corners of the vehicle M, and can monitor both front and rear sides of the vehicle M. The radar 20 is, for example, a millimeter wave radar, but is not limited to this.

The vehicle M of the present embodiment is a vehicle that is assumed to be driven by an occupant and has a simple monitoring sensor group (the camera 10 and the radars 20) compared with so-called automated driving vehicles (automated driving vehicles of level 3 or higher). Thus, a blind spot area DA that is not detected by the monitoring sensor group may be present at the side of the vehicle M. However, the vehicle M may have a group of monitoring sensors capable of monitoring 360 degrees around the vehicle M like an automated driving vehicle of level 3 or higher.

The driving assistance device 100 is a device that supports a process of smoothly making merging to a main roadway or a lane change to an adjacent lane. The driving assistance device 100 assists the driver in driving by outputting a notification sound from the speaker 60, which will be described below. Details of the driving assistance device 100 will be described below.

The vehicle M is equipped with driving operation elements such as an accelerator pedal, a brake pedal, and a steering wheel, a motive power output device that performs acceleration/deceleration and steering in accordance with an amount of operation on the driving operation element, a steering device, and the like, but illustration and detailed description thereof are omitted. Also, in the following description, an accelerator position that is an amount of operation on the accelerator pedal may be denoted by Qap.

Here, the difficulty of driving in the merging/lane change will be described with reference to FIGS. 2 to 4. Hereinafter, the term "merging" is used in a meaning including both "merging to the main roadway" and "lane change."

Figure 2:
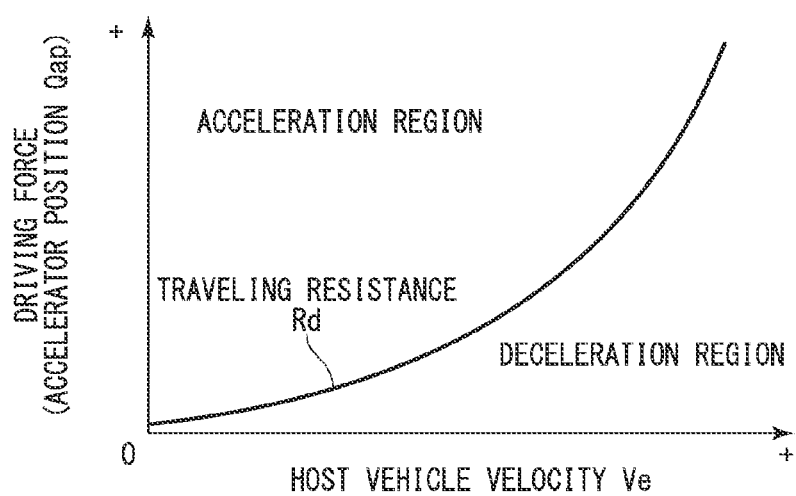
FIG. 2 is a graph showing a relationship between a velocity and a driving force of a vehicle.

FIG. 2 is a graph showing a relationship between a velocity Ve, which is a velocity of the vehicle M and a driving force of the vehicle M ($\approx$accelerator position Qap). As shown in FIG. 2, traveling resistance Rd increases exponentially as the velocity Ve increases. A region where the driving force of the vehicle M for the velocity Ve is higher than the traveling resistance Rd is an acceleration region where the vehicle M is accelerated. A region where the driving force of the vehicle M for the velocity Ve is lower than the traveling resistance Rd is a deceleration region where the vehicle M is decelerated.

Figure 3:
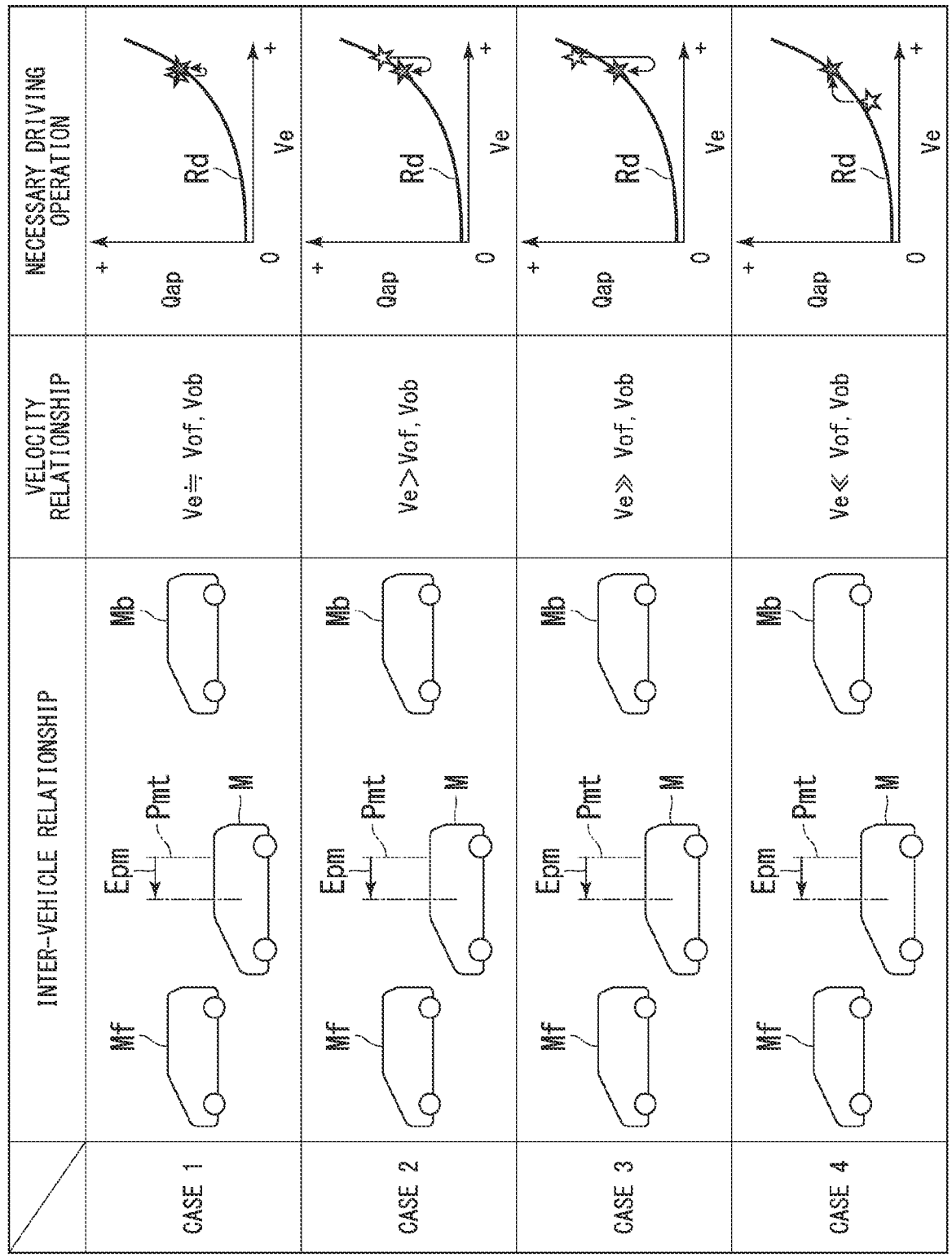
FIG. 3 is a diagram showing several situations related to merging.

FIG. 3 is a diagram showing several situations (cases 1 to 4) related to merging. Cases 1 to 4 are classifications focusing on differences in velocity relationships between the vehicle M and other vehicles. Hereinafter, among other vehicles traveling in a lane (a second lane) of a merging destination of the vehicle M, the other vehicle traveling immediately in front of a target position Pmt is referred to as a "forward vehicle Mf" and the other vehicle traveling immediately behind the target position Pmt is referred to as a "rearward vehicle Mb." Hereinafter, a velocity of the forward vehicle Mf is referred to as a "velocity Vof" and a velocity of the rearward vehicle Mb is referred to as a "velocity Vob." The target position Pmt is "a position between two vehicles moving in the second lane where there is no traffic participant such as a vehicle between them." Also, a position error in a traveling direction of the vehicle M with respect to the target position Pmt (there is also a position error in a lateral direction because the vehicle M is in the first lane) is defined as "a relative position error Epm." The target position Pmt is set, for example, at a central position between the forward vehicle Mf and the rearward vehicle Mb with respect to the traveling direction of the vehicle M, or a slightly forward position relative to the central position. In the graph on the right side of FIG. 3, a white star mark indicates a "driving force at the start of merging" and a hatched star mark indicates a "driving force at the time of merging."

Case 1 is a case where the velocity Ve is substantially the same as the velocity Vof of the forward vehicle Mf and the velocity Vob of the rearward vehicle Mb (the relative velocity is substantially zero) and the vehicle M is positioned slightly in front of the target position Pmt. In this case, the driver needs to perform deceleration by slightly releasing the accelerator pedal and then depress the accelerator pedal again to restore the original accelerator position.

Case 2 is a case where the velocity Ve is slightly higher than the velocity Vof of the forward vehicle Mf and the velocity Vob of the rearward vehicle Mb and the vehicle M is positioned slightly in front of the target position Pmt. In this case, the driver needs to perform deceleration by returning the accelerator pedal to an appropriate level and then depress the accelerator pedal again to an appropriate accelerator position lower than the original accelerator position.

Case 3 is a case where the velocity Ve is excessively higher than the velocity Vof of the forward vehicle Mf and the velocity Vob of the rearward vehicle Mb and the vehicle M is positioned slightly in front of the target position Pmt. In this case, the driver needs to perform deceleration by significantly releasing the accelerator pedal such that an excessive velocity is limited and then depress the accelerator pedal again to an appropriate accelerator position lower than the original accelerator position.

Case 4 is a case where the velocity Ve is excessively slower than the velocity Vof of the forward vehicle Mf and the velocity Vob of the rearward vehicle Mb and the vehicle M is positioned slightly in front of the target position Pmt. In this case, the driver needs to perform acceleration by significantly depressing the accelerator pedal and then gradually return the accelerator pedal to an appropriate accelerator position higher than the original accelerator position.

As described above, even if the relative positions of the vehicle M and the other vehicle are the same, the time-series movement of the required accelerator position is completely different due to the difference in the relative velocity. The driver needs to align the position of the vehicle M with an appropriate position for other vehicles at the time of merging and also set a relative velocity associated with the other vehicles to substantially zero. That is, the driver should adjust two elements (a position and a velocity) simultaneously. Thus, merging can be an operation that is particularly difficult for beginners and drivers who are not good at driving.

FIG. 4 is a diagram showing several situations (cases 5 to 8) from other points of view related to merging. Cases 5 to 8 are classifications focusing on differences in positional relationships between the vehicle M and other vehicles.

Like case 1, case 5 is a case where the velocity Ve is substantially the same as the velocity Vof of the forward vehicle Mf and the velocity Vob of the rearward vehicle Mb (the relative velocity is substantially zero) and the vehicle M is positioned slightly in front of the target position Pmt. In this case, the driver needs to perform deceleration by slightly releasing the accelerator pedal and then depress the accelerator pedal again to the original accelerator position.

Case 6 is a case where the velocity Ve is substantially the same as the velocity Vof of the forward vehicle Mf and the velocity Vob of the rearward vehicle Mb (the relative velocity is substantially zero) and the vehicle M is positioned far in front of the target position Pmt. In this case, the driver needs to perform deceleration by significantly releasing the accelerator pedal and depress the accelerator pedal again to the original acceleration opening degree while allowing the forward vehicle Mf to move forward.

Case 7 is a case where the velocity Ve is substantially the same as the velocity Vof of the forward vehicle Mf and the velocity Vob of the rearward vehicle Mb (the relative velocity is substantially zero) and the vehicle M is positioned far behind the target position Pmt. In this case, the driver needs to perform acceleration by depressing the accelerator pedal and then gradually return the accelerator pedal to the original accelerator position.

Case 8 is a case where the velocity Ve is excessively higher than the velocity Vof of the forward vehicle Mf and the velocity Vob of the rearward vehicle Mb and the vehicle M is positioned far behind the target position Pmt. In this case, a host vehicle position is behind the target position Pmt, but the driver needs to align the host vehicle position with the target position Pmt while releasing the accelerator pedal such that an excessive velocity is limited and set the accelerator position higher than the original accelerator position.

As described above, even if the relative velocities of the vehicle M and the other vehicles are the same, the time-series movement of the required accelerator position is completely different due to the difference in the relative positions. Even in this case, the driver needs to align the position of the vehicle M with an appropriate position for other vehicles at the time of merging and also set a relative velocity associated with the other vehicles to substantially zero. For example, as in case 8, even if the vehicle M is positioned behind the target position Pmt, there are cases where the accelerator pedal should be released contrary to the sense of position control. From this point of view, merging can be an operation that is particularly difficult for beginners and drivers who are not good at driving.

[Configuration]

Figure 5:
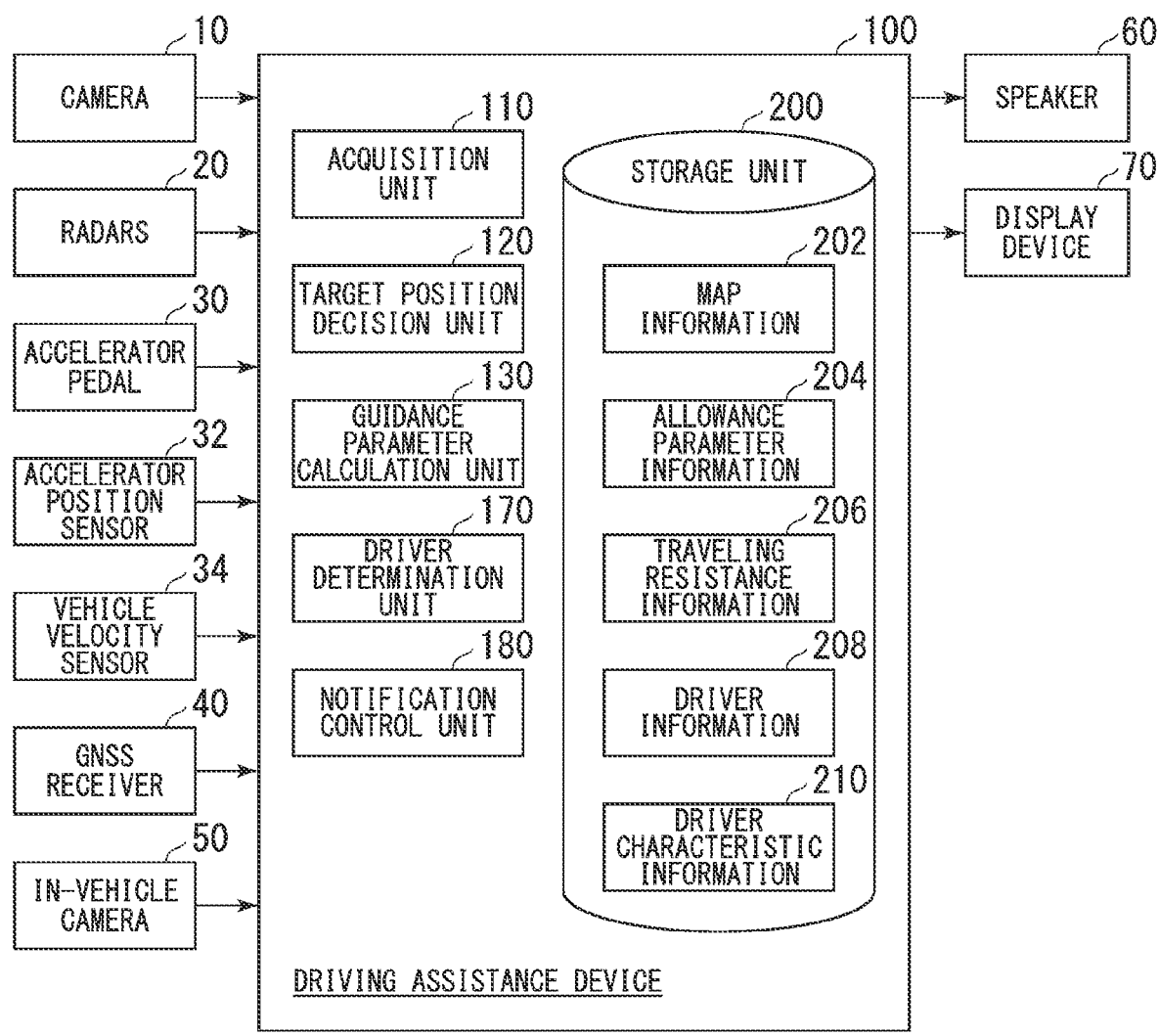
FIG. 5 is a configuration diagram of the vehicle M focusing on the driving assistance device.

FIG. 5 is a configuration diagram of the vehicle M focusing on the driving assistance device 100. The vehicle M may be equipped with an accelerator pedal 30, an accelerator position sensor 32, a vehicle velocity sensor 34, a GNSS receiver 40, an in-vehicle camera 50, a speaker 60, a display device 70, and the like in addition to the above-described components.

The accelerator position sensor 32 detects an amount of operation on the accelerator pedal 30 and outputs a detection result as the accelerator position Qap to the motive power output device and the driving assistance device 100. The vehicle velocity sensor 34 detects the velocity Ve of the vehicle M and outputs the detected velocity Ve to a meter device and the driving assistance device 100.

The GNSS receiver 40 measures a position of the vehicle M on the basis of radio waves received from GNSS satellites (for example, GPS satellites). The GNSS receiver 40 outputs a positioning result to the driving assistance device 100.

The in-vehicle camera 50 is provided in a cabin of the vehicle M and captures an image of the driver.

The speaker 60 is provided in the cabin of the vehicle M and outputs a notification sound or the like to be described below.

The display device 70 is a display unit provided within the meter or a head-up display (HUD) and displays a predetermined image.

The driving assistance device 100 includes, for example, an acquisition unit 110, a target position decision unit 120, a guidance parameter calculation unit 130, a driver determination unit 170, a notification control unit 180, and a storage unit 200. The components other than the storage unit 200 are implemented, for example, by a hardware processor such as a central processing unit (CPU) executing a program (software). Some or all of these components may be implemented by hardware (including a circuit unit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory or may be stored in a removable storage medium (the non-transitory storage medium) such as a DVD or a CD-ROM and installed in the storage device when the storage medium is mounted in a drive device.

The storage unit 200 is an HDD, a flash memory, a ROM, a random access memory (RAM), or the like. The storage unit 200 stores information such as map information 202, allowance parameter information 204, traveling resistance information (a traveling resistance table) 206, driver information 208, and driver characteristic information 210.

The acquisition unit 110 acquires information about the target position when the vehicle M merges or changes lanes from a first lane to a second lane. Also, when the acquisition unit 110 has received an input from a user who desires to be guided for merging (for example, an input by voice such as "start merging guidance" to an in-vehicle microphone), it is recognized that the vehicle M merges or changes lanes from the first lane to the second lane. Details of the "information about the target position" will be described below.

When there are a plurality of inter-vehicle positions that can be target positions, the target position decision unit 120 selects one target position on the basis of a predetermined criterion. Although the predetermined criterion is any criterion related to a distance from the vehicle M, an inter-vehicle space, and other information, detailed description thereof is omitted because the predetermined criterion is not a core part of the present invention. As an example, it is assumed that the target position closest to the vehicle M is selected.

The guidance parameter calculation unit 130 calculates a degree to which the vehicle M should accelerate and a degree to which the vehicle M should decelerate such that position alignment for the traveling direction of the vehicle M (the longitudinal direction of the road) is performed with respect to the target position. In the following description, it is assumed that the degree to which acceleration is necessary and the degree to which deceleration is necessary are calculated as one value (a guidance parameter Flead), acceleration is represented by a positive value, and deceleration is represented by a negative value. Details will be described below.

The driver determination unit 170 determines who an occupant (a driver) sitting in the driver's seat is on the basis of an image captured by the in-vehicle camera 50.

The notification control unit 180 causes the speaker 60 to output a sound (hereinafter referred to as a notification sound) on the basis of the guidance parameter Head. A specific aspect of the notification sound will be described below.

Figure 6:
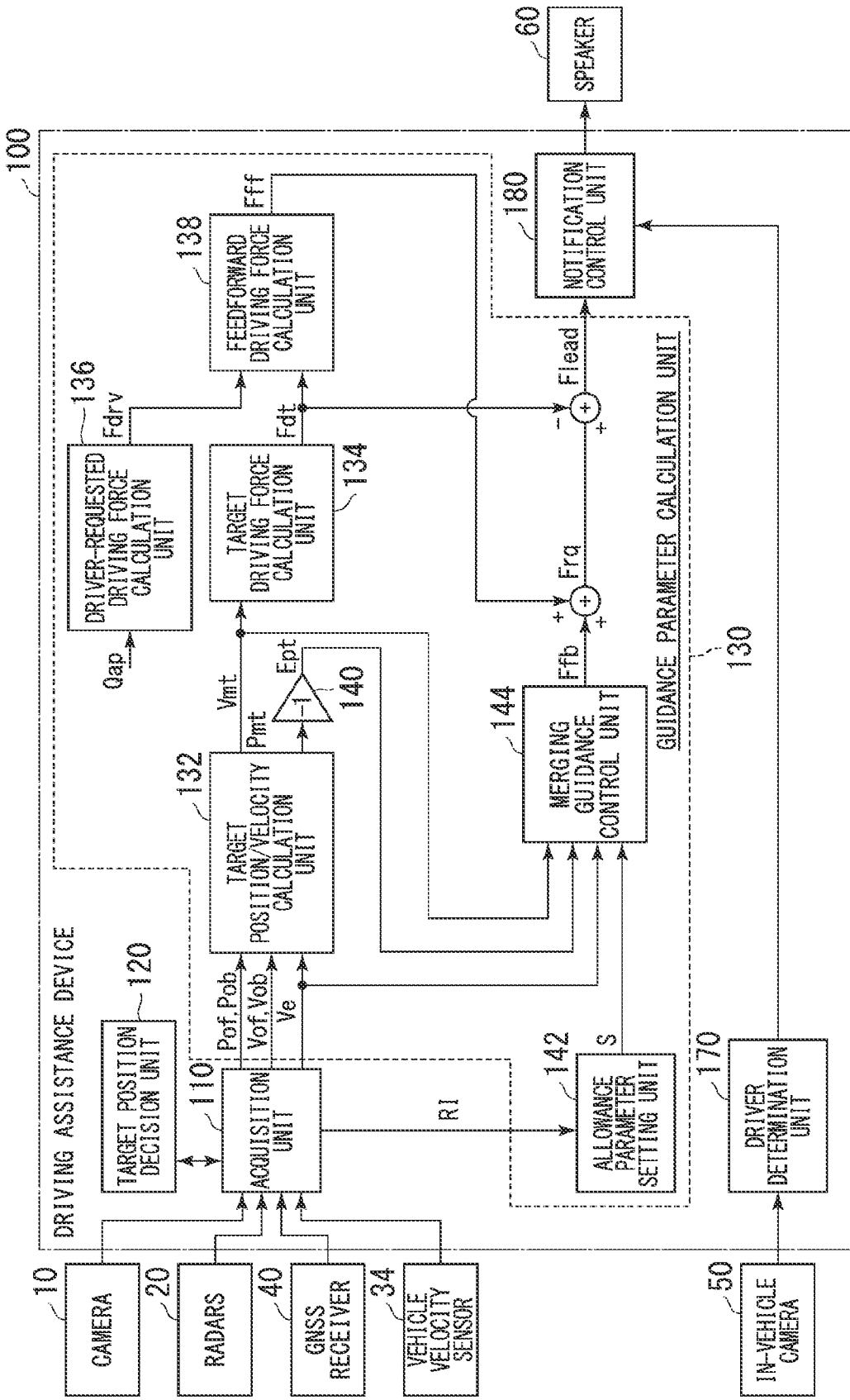
FIG. 6 is a block diagram for describing a function of each part of the driving assistance device focusing on a configuration of a guidance parameter calculation unit.

FIG. 6 is a block diagram for describing a function of each part of the driving assistance device 100 focusing on the configuration of the guidance parameter calculation unit 130. The guidance parameter calculation unit 130 includes, for example, a target position/velocity calculation unit 132, a target driving force calculation unit 134, a driver-requested driving force calculation unit 136, a feedforward driving force calculation unit 138, a relative position deviation calculation unit 140, an allowance parameter setting unit 142, and a merging guidance control unit 144.

The acquisition unit 110 acquires information about the above-described target position. The information about the target position includes, for example, a relative position Pof of the forward vehicle Mf to the vehicle M, a relative position Pob of the rearward vehicle Mb to the vehicle M, the velocity Vof of the forward vehicle Mf, and the velocity Vob of the rearward vehicle Mb. The relative position Pof of the forward vehicle Mf may be a position of a representative point such as the center of gravity of the forward vehicle Mf or may be a position of a rear end. Also, the relative position Pob of the rearward vehicle Mb may be the position of a representative point such as the center of gravity of the rearward vehicle Mb or may be the position of the rear end. The relative positions Pof and Pob are represented by, for example, a relative coordinate system with the vehicle M as a reference. For example, the acquisition unit 110 acquires the above-described information by analyzing the image captured by the camera 10, identifying a region where the vehicle is shown, and performing a sensor fusion process in consideration of the detection result of the radar 20. The acquisition unit 110 also acquires the velocity Ve of the vehicle M from the vehicle velocity sensor 34. The acquisition unit 110 outputs the information to the target position/velocity calculation unit 132. The velocity Ve of the vehicle M is also output to the merging guidance control unit 144. Also, the target position decision unit 120 selects one target position on the basis of a predetermined criterion when there are a plurality of inter-vehicle positions that can be the target position on the basis of various types of information acquired by the acquisition unit 110.

Further, the acquisition unit 110 derives course information RI on the basis of the image captured by the camera 10 and outputs the derived course information RI to the allowance parameter setting unit 142. The course information RI is information indicating a shape of a lane in which the vehicle M travels and is information for recognizing a distance that can be used for merging. Also, the acquisition unit 110 may derive the course information RI on the basis of a detection result of the GNSS receiver 40 and the map information 202 instead of (or in addition to) the detection result of the camera 10. The map information 202 is information including a type of lane (a type such as a main lane, a merging lane, a passing lane, or a climbing lane) and a distance of each lane (a length of the merging lane or the like).

[Calculation of Guidance Parameters]

The target position/velocity calculation unit 132 calculates the target position Pmt on the basis of the relative positions Pof and Pob. The target position/velocity calculation unit 132 calculates, for example, a center position between the relative position Pof and the relative position Pob in the traveling direction of the vehicle as the target position Pmt. Alternatively, the target position/velocity calculation unit 132 may calculate a position ahead of the central position between the relative position Pof and the relative position Pob in the traveling direction of the vehicle by a predetermined amount (or a predetermined proportion) as the target position Pmt. For example, the target position Pmt is calculated in a relative coordinate system with the vehicle M as a reference. The target position/velocity calculation unit 132 outputs the calculated target position Pmt to the relative position deviation calculation unit 140.

Furthermore, the target position/velocity calculation unit 132 calculates a target merging velocity Vmt, which is a target velocity for merging, on the basis of the velocities Vof and Vob. For example, the target position/velocity calculation unit 132 calculates a velocity that is the same as the velocity Vof of the forward vehicle Mf as the target merging velocity Vmt. Alternatively, when the velocity Vob of the rearward vehicle Mb is higher than the velocity Vof of the forward vehicle Mf, the target position/velocity calculation unit 132 may calculate a median value between the velocities Vof and Vob as the target merging velocity Vmt. The target position/velocity calculation unit 132 outputs the calculated target merging velocity Vmt to the target driving force calculation unit 134.

The target driving force calculation unit 134 calculates a target merging driving force Fdt of the vehicle M on the basis of the target merging velocity Vmt and the traveling resistance information 206. That is, the target driving force calculation unit 134 calculates the merging driving force required to implement the target merging velocity Vmt as the target merging driving force Fdt with reference to the traveling resistance information 206. The traveling resistance information 206 is information indicating a corresponding relationship between the velocity Ve and the driving force (the accelerator position Qap) required to implement the velocity Ve, as shown in FIG. 2. The target driving force calculation unit 134 outputs the calculated target merging driving force Fdt to the feedforward driving force calculation unit 138.

The accelerator position Qap is input to the driver-requested driving force calculation unit 136. The driver-requested driving force calculation unit 136 calculates a driver-requested driving force Fdry corresponding to the input accelerator position Qap on the basis of the input accelerator position Qap and, for example, a pre-registered conversion equation. The driver-requested driving force calculation unit 136 outputs the calculated driver-requested driving force Fdry to the feedforward driving force calculation unit 138.

The feedforward driving force calculation unit 138 calculates a feedforward driving force Fff on the basis of the driver-requested driving force Fdry and the target merging driving force Fdt. The feedforward driving force calculation unit 138 calculates the feedforward driving force Fff on the basis of, for example, a model for smoothly connecting the driver's requested driving force Fdry and the target merging driving force Fdt (connecting them with a ramp).

The feedforward driving force Fff calculated by the feedforward driving force calculation unit 138 is added to a guidance feedback driving force Ffb calculated by the merging guidance control unit 144. Thereby, a required driving force Frq is calculated.

The relative position deviation calculation unit 140 calculates relative position deviation Ept on the basis of the target position Pmt. For example, the relative position deviation Ept is calculated in a relative coordinate system with the vehicle M as a reference. In this case, the relative position deviation Ept is calculated by multiplying the target position Pmt by "−1." That is, the relative position deviation calculation unit 140 calculates the relative position deviation Ept on the basis of, for example, Eq. (1). The relative position deviation calculation unit 140 outputs the calculated relative position deviation Ept to the merging guidance control unit 144.

$$Ept(k)=-Pmt(k) \qquad (1)$$

The allowance parameter setting unit 142 sets an allowance parameter S (0<S) for each merging situation on the basis of the course information RI and the allowance parameter information 204. The allowance parameter information 204 is information indicating a corresponding relationship between an available merging distance and the allowance parameter S. The allowance parameter setting unit 142 outputs the set allowance parameter S to the merging guidance control unit 144. As the allowance parameter S increases, the allowance of acceleration/deceleration at the time of merging increases.

Figure 7:
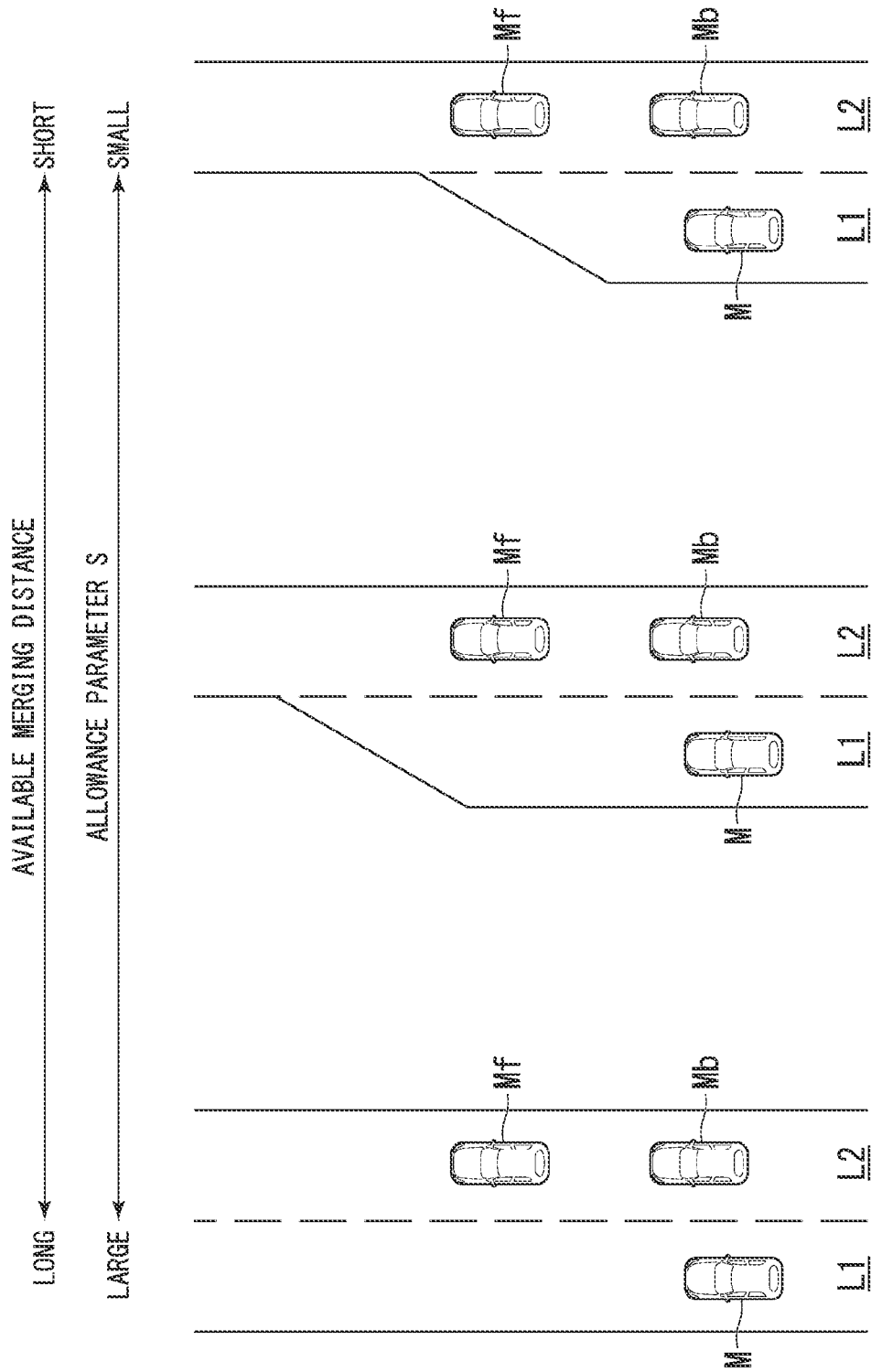
FIG. 7 is a diagram conceptually showing an allowance parameter setting method.

FIG. 7 is a diagram conceptually showing a method of setting the allowance parameter S. In FIG. 7, L1 denotes a first lane and L2 denotes a second lane. On the basis of the course information RI, the allowance parameter setting unit 142 sets a larger allowance parameter S when the available merging distance is longer and sets a smaller allowance parameter S when the available merging distance is shorter. The allowance parameter S is a parameter with which the allowable of acceleration/deceleration at the time of merging decreases as the allowance parameter S decreases. As the allowance parameter S decreases, the inclination of the switching function 6 (FIG. 8) to be described below increases. It becomes necessary to align the position of vehicle M with a target merging position in a short time while maintaining large deviation between a target merging velocity and the velocity of the vehicle M.

Referring back to FIG. 6, the merging guidance control unit 144 calculates the guidance feedback driving force Ffb on the basis of the target merging velocity Vmt, the relative position deviation Ept, the velocity Ve, and the allowance parameter S.

Figure 8:
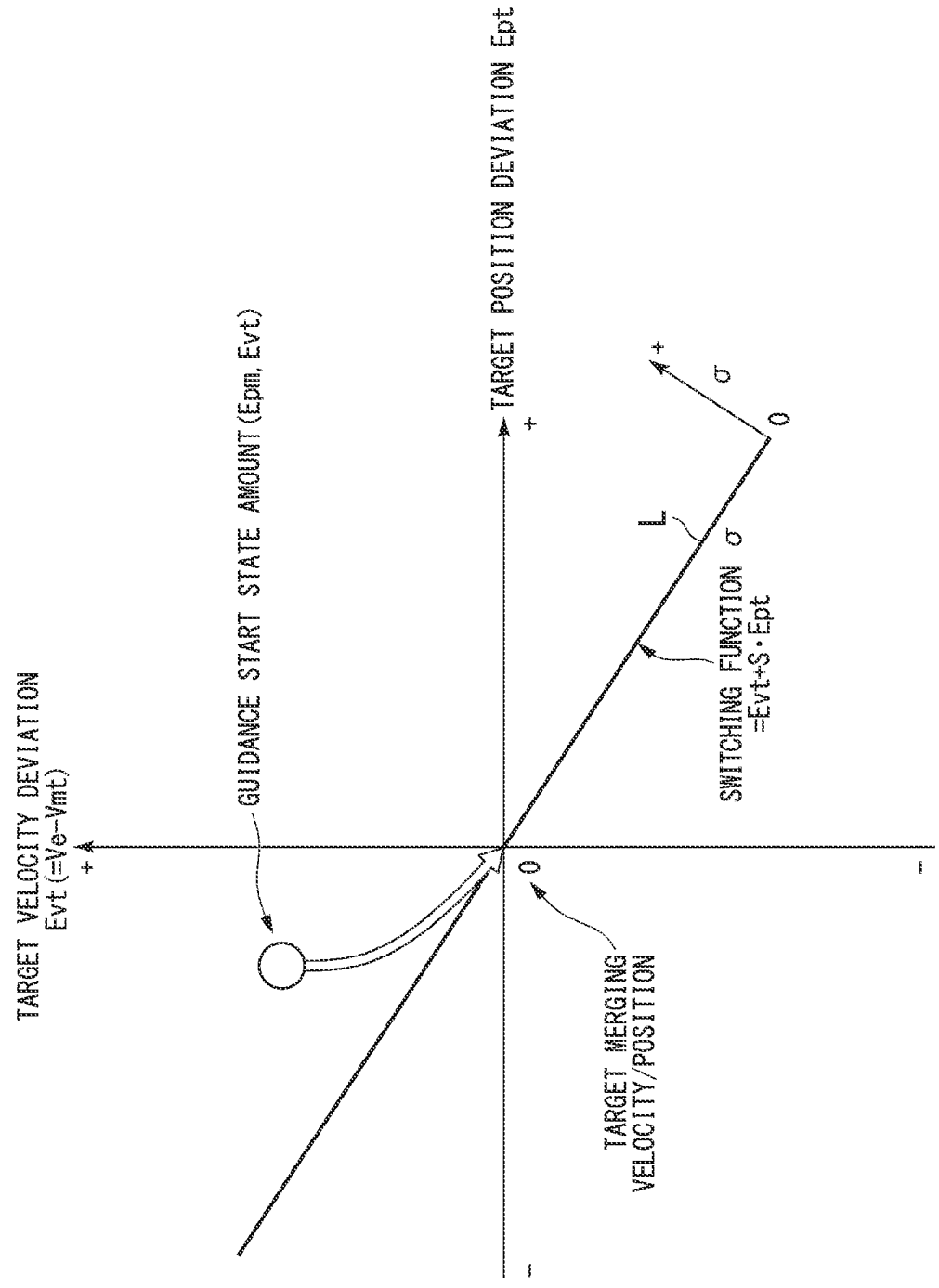
FIG. 8 is a diagram conceptually showing a calculation process of a merging guidance control unit.

FIG. 8 is a diagram conceptually showing a calculation process of the merging guidance control unit 144. The merging guidance control unit 144 first calculates target velocity deviation Evt on the basis of the target merging velocity Vmt and the velocity Ve. The target velocity deviation Evt is calculated, for example, on the basis of Eq. (2).

$$Evt(k)=Ve(k)-Vmt(k) \qquad (2)$$

The merging guidance control unit 144 calculates the guidance feedback driving force Ffb for causing both the relative position deviation Ept and the target velocity deviation Evt to converge to zero at the same time. The merging guidance control unit 144 of the present embodiment calculates the guidance feedback driving force Ffb for causing both the relative position deviation Ept and the target velocity deviation Evt to converge to zero at the same time on the basis of the response-designated control (pole-assignment control, for example, sliding mode control, backstepping control, or the like). That is, the merging guidance control unit 144 calculates the guidance feedback driving force Ffb for causing both the relative position deviation Ept and the target velocity deviation Evt to be close to a straight-line L where a switching function σ=Evt+SxEpt=0 (for example, to be close thereto with exponential decay) at the same time.

Specifically, the guidance feedback driving force Ffb is calculated on the basis of the following Eqs. (3) to (6). S denotes a merging guidance parameter, Ept denotes target position deviation, Evt denotes target velocity deviation, Ve denotes a velocity, Vmt denotes a target merging velocity, Pmt denotes a target relative merging position, k denotes a control time (a control cycle), and Ffb denotes a guidance feedback driving force, Ffb_rch denotes an arrival rule input, Ffb_adp denotes an adaptation rule input, and Krch and Kadp denote feedback gains.

$$\sigma(k)=Ept(k)+S(k)\cdot Evt(k) \qquad (3)$$

$$\mathit{Ffb\_rch}(k)=Krch\cdot \sigma(k) \qquad (4)$$

$$\begin{aligned}\mathit{Ffb\_adp}(k)=\mathit{Ffb\_adp}(k-1)+Kadp\cdot \sigma(k)\text{(at the time of}\\ \text{guidance execution) or }=-Krch\text{ }\sigma(k)\text{(at the time}\\ \text{of non-guidance execution)}\end{aligned} \qquad (5)$$

$$\mathit{Ffb}(k)=\mathit{Ffb\_rch}(k)+\mathit{Ffb\_adp}(k) \qquad (6)$$

In the above-described calculation process, the merging guidance control unit 144 calculates time-series driving force data that can converge to the target merging position/velocity.

Figure 9:
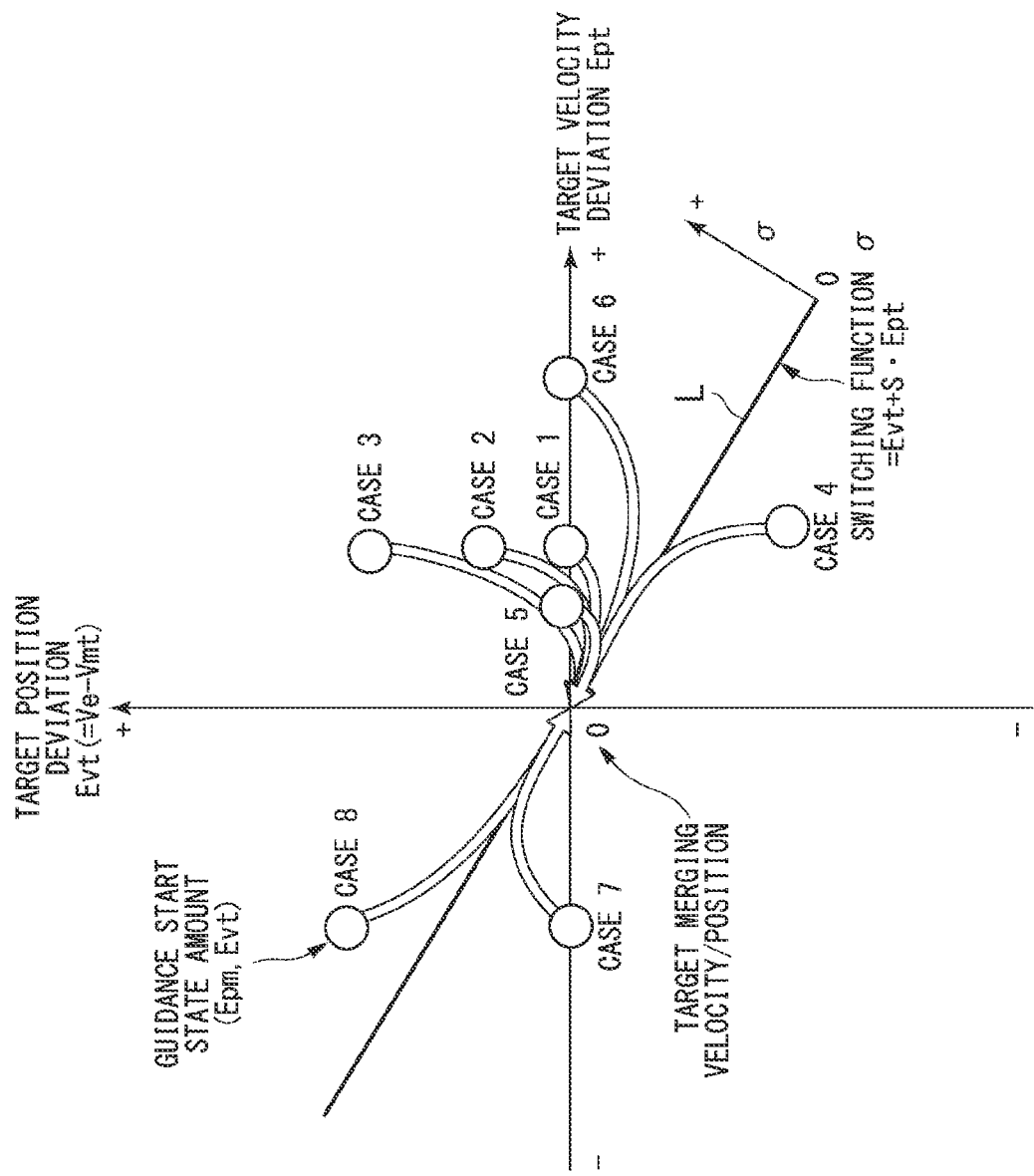
FIG. 9 is a diagram conceptually showing a case where response-designated control is used for cases 1 to 8.

FIG. 9 is a diagram conceptually showing a case where response-designated control is used with respect to the above-described cases 1 to 8. By using the response-designated control, the ideal acceleration/deceleration behavior of the vehicle M can be expressed in any merging situation. Also, the calculation of the driving force at the time of merging is not limited to the response-designated control and another control method such as cascade control may be used.

The guidance parameter Flead is calculated by subtracting the target merging driving force Fdt from the required driving force Frq. That is, the guidance parameter Flead is calculated as a difference for the driving force for providing the target merging velocity at the time of merging. When the vehicle M is maintained at the target velocity, the guidance parameter Flead becomes zero. The guidance parameter Flead that has been calculated is output to the notification control unit 180.

An image captured by the in-vehicle camera 50 is input to the driver determination unit 170. The driver determination unit 170 determines the driver who drives the vehicle M on the basis of the detection result of the in-vehicle camera 50 and the driver information 208. The driver information 208 is, for example, information in which an image or information indicating a feature quantity of the image is associated with a driver ID. The driver determination unit 170 may acquire the driver ID by inputting an image to a trained model generated in machine learning. The driver ID is output to the notification control unit 180. Also, the driver determination unit 170 and the adjustment function of the sound parameter Psound for each driver ID to be described below may be omitted.

[Notification Control]

The notification control unit 180 calculates the sound parameter Psound on the basis of the guidance parameter Flead. When the guidance parameter Flead is a positive value, the notification control unit 180 calculates the sound parameter such that the sound parameter Psound increases as the guidance parameter Flead increases. Also, when the guidance parameter Flead is a negative value, the notification control unit 180 calculates the sound parameter such that the sound parameter Psound is a negative value and its absolute value increases as the absolute value of the guidance parameter Flead increases. As described below, the sound parameter Psound may be adjusted for each characteristic of the driver. Either the guidance parameter Flead or the sound parameter Psound is an example of "a degree to which a host moving body should accelerate" and "a degree to which the host moving body should decelerate."

The notification control unit 180 causes the speaker 60 to output a notification sound corresponding to the sound parameter Psound. Here, the notification control unit 180 causes the speaker 60 to output an acceleration guidance sound when the sound parameter Psound is positive (when acceleration is necessary), output a deceleration guidance sound when the sound parameter Psound is negative (when deceleration is necessary), and output a neutral guidance sound when the sound parameter Psound is near zero (when neither acceleration nor deceleration is necessary). The acceleration guidance sound is a sound (a high-frequency sound) higher than the neutral guidance sound and the deceleration guidance sound is a sound (a low-frequency sound) lower than the neutral guidance sound. The output of the neutral guidance sound may be omitted. Even in this case, the acceleration guide sound is higher than the deceleration guide sound.

Here, when an expensive multi-way speaker is used, the range of a frequency of a sound capable of being reproduced is wide, such that it is possible to guide the driver using a sound (L&H) having a sufficient pitch difference that is easy for humans to recognize. However, the cost of in-vehicle products is significantly limited and it may be difficult to provide an expensive multi-way speaker system only for use in the driving assistance device 100. Consequently, as a result of using an inexpensive speaker, there is concern that the pitch difference of the notification sound will become small and the guidance effect will be reduced.

(Configuration of Notification Sound)

Therefore, when the sound parameter Psound is positive, the notification control unit 180 of the embodiment causes the speaker 60 to output a sound obtained by combining a basic sound for acceleration guidance with one or more additional sounds for the acceleration guidance each having a higher frequency than the basic sound for the acceleration guidance. Also, when the sound parameter Psound is negative, the notification control unit 180 causes the speaker 60 to output a sound obtained by combining a basic sound for deceleration guidance with one or more additional sounds for the deceleration guidance each having a lower frequency than the basic sound for the deceleration guidance.

Figure 10:
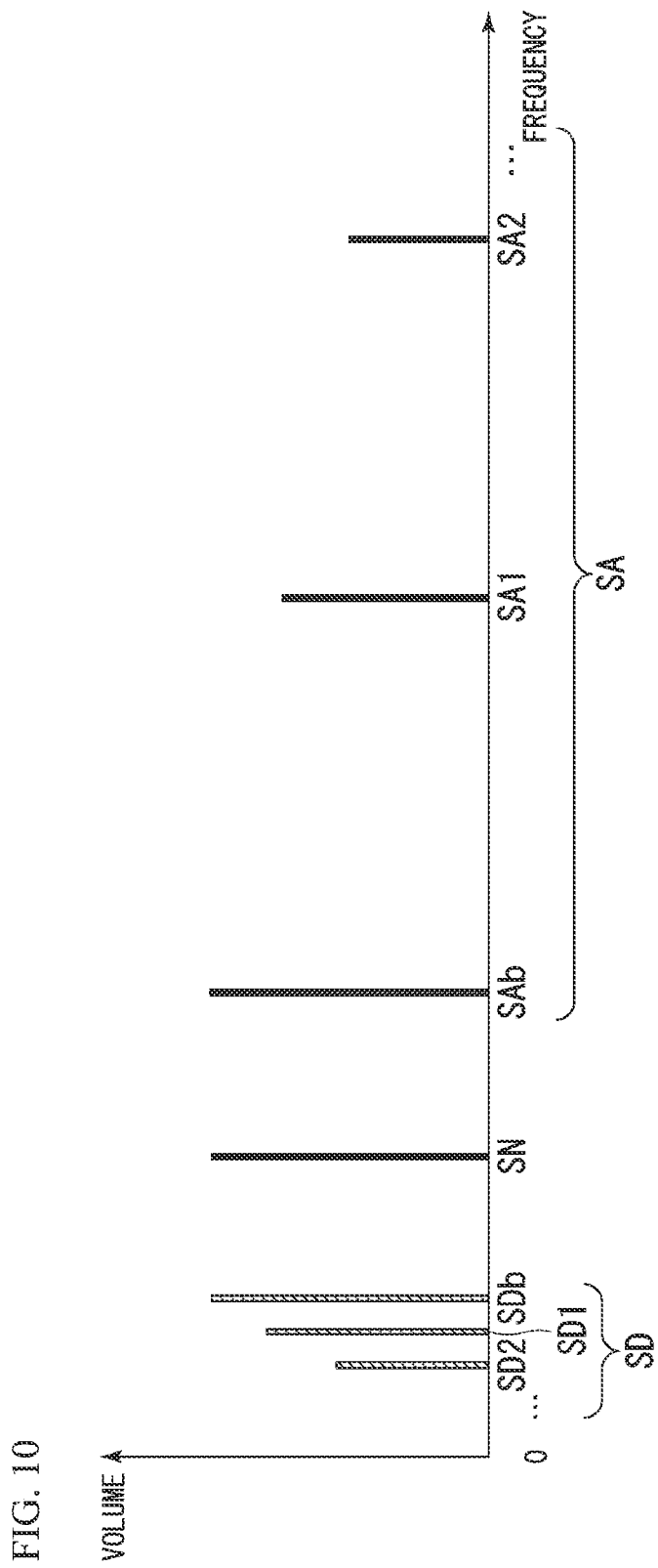
FIG. 10 is a diagram for describing a configuration of a notification sound that a notification control unit causes a speaker to output.

FIG. 10 is a diagram for describing a configuration of a notification sound that the notification control unit 180 causes the speaker 60 to output. In FIG. 10, SN denotes a neutral notification sound, SAb denotes a basic sound for acceleration guidance, SA1 and SA2 denote additional sounds for the acceleration guidance, SDb denotes a basic sound for deceleration guidance, and SD1 and SD2 denote additional sounds for the deceleration guidance. Although two additional sounds for the deceleration guidance and two additional sounds for the acceleration guidance are shown in FIG. 10, these are merely examples.

More specifically, when the sound parameter Psound is positive, the notification control unit 180 causes the speaker 60 to output a sound obtained by combining the basic sound SAb for the acceleration guidance with additional sounds SAn (n is a natural number) for the acceleration guidance that are inter-order harmonic sounds each having a multiple of a frequency of the basic sound SAb for the acceleration guidance. Additional sounds n for the acceleration guidance may include a plurality of integer-order harmonic sounds having different orders. Only the basic sound SAb for the acceleration guidance may be output. Hereinafter, a notification sound that includes the basic sound SAb for the acceleration guidance and may include one or more additional sounds SAn for the acceleration guidance is referred to as a notification sound SA for the acceleration guidance.

Also, when the sound parameter Psound is negative, the notification control unit 180 causes the speaker 60 to output a sound obtained by combining the basic sound SDb for the deceleration guidance with additional sounds SDm (m is a natural number) for the deceleration guidance each having a frequency different from (i.e., not having a fundamental tone of the basic sound SDb for the deceleration guidance) a frequency that is 1/q (q is a natural number) times a frequency of the basic sound SDb for the deceleration guidance. The additional sounds SDm for the deceleration guidance may include a plurality of sounds with different frequencies. Only the basic sound SDb for the deceleration guidance may be output. Hereinafter, a notification sound that includes the basic sound SDb for the deceleration guidance and may include one or more additional sounds SDm for the deceleration guidance is referred to as a notification sound SD for the deceleration guidance.

The notification control unit 180 causes the speaker 60 to output a sound having a frequency by generating a signal obtained by combining sine waves for each frequency and causing the speaker 60 to output the signal in both the notification sound SA for the acceleration guidance and the notification sound SD for the deceleration guidance.

Because the notification sound SA for the acceleration guidance including the basic sound SAb for the acceleration guidance having the fundamental tone and the additional sounds SAn for the acceleration guidance which are integer-order harmonic sounds is heard like an echo as if a sound higher than an actual sound is output, a degree of alertness for the driver increases and it becomes easy to distinguish the notification sound SA from the notification sound SD for the deceleration guidance and the neutral notification sound SN. On the other hand, the notification sound SD for the deceleration guidance including the basic sound SDb for the deceleration guidance and the additional sounds SDm for the deceleration guidance that do not have the fundamental tone of the basic sound SDb for the deceleration guidance gives the driver a sense of safety and familiarity and has the characteristic of arousing the driver's attention in another sense separate from that of the notification sound SA for the acceleration guidance. Thus, it is possible to easily distinguish the notification sound SD from the notification sound SA for the acceleration guidance and the neutral notification sound SN. As a result, even if an expensive multi-way speaker is not used, a significant pitch difference in the notification sound can be felt and the driver can be allowed to intuitively determine whether acceleration guidance or deceleration guidance is being performed.

Based on the above, the notification control unit 180 may perform some or a plurality of option control processes to be described below in combination.

(Option Control 1)

When the sound parameter Psound is positive, the notification control unit 180 may shift the basic sound SAb for the acceleration guidance to a higher-sound side (a higher-frequency side) as the sound parameter Psound increases. Also, when the sound parameter Psound is negative, the notification control unit 180 may shift the basic sound SDb for the deceleration guidance to a lower-sound side (a lower-frequency side) as the absolute value of the sound parameter Psound increases. However, in this case, the frequency of the additional sound SAn for the acceleration guidance becomes excessively high and the frequency of the additional sound SDm for the deceleration guidance becomes excessively low, which may make it difficult to perceive them.

(Option Control 2)

Figure 11:
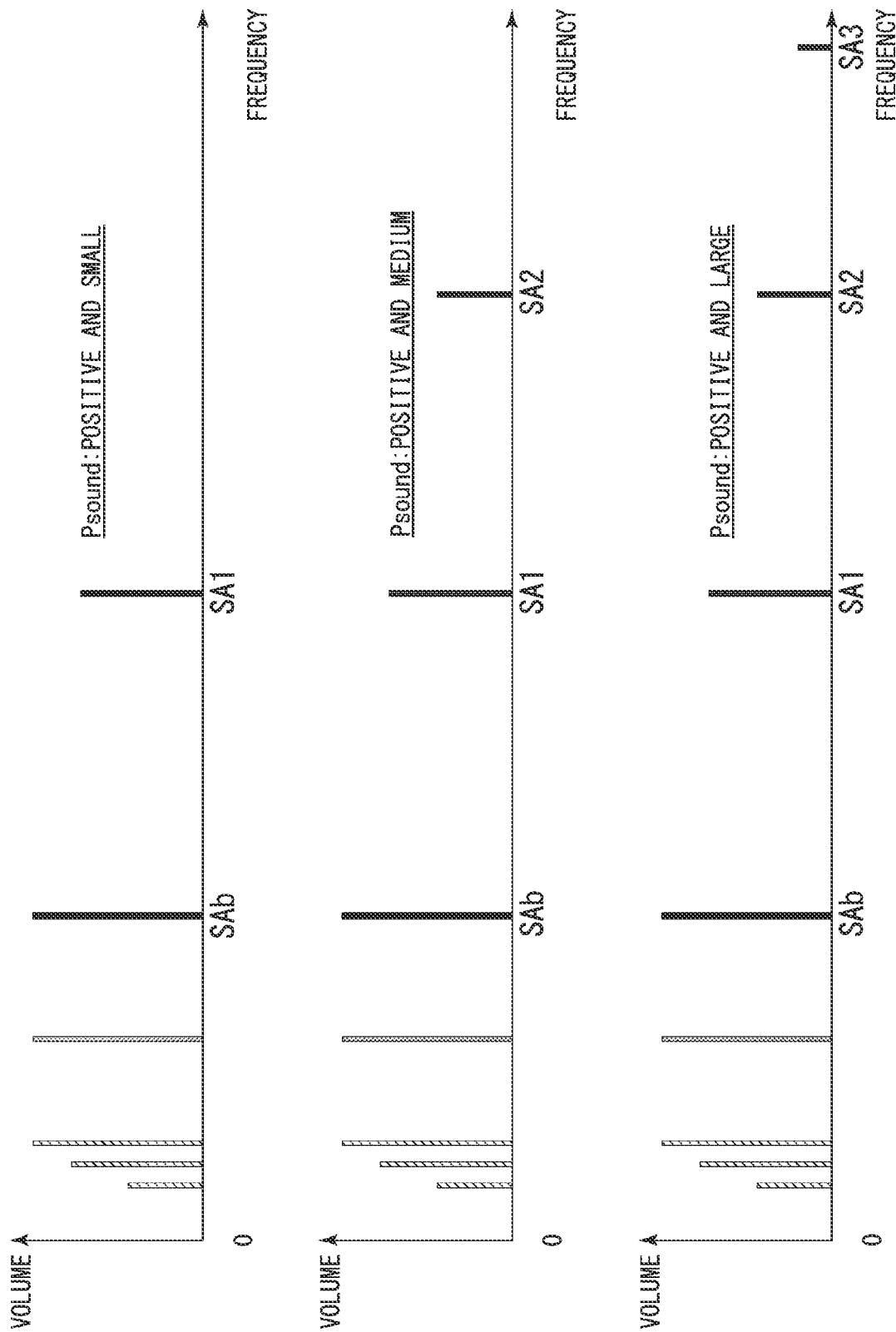
FIG. 11 is a diagram for describing option control 2.

When the sound parameter Psound is positive, the notification control unit 180 may increase an order number of the integer-order harmonic sound that is the additional sound SAn for the acceleration guidance as the sound parameter Psound increases. FIG. 11 is a diagram for describing option control 2. For example, the notification control unit 180 causes the speaker 60 to output a sound by combining only the additional sound SA1 for the acceleration guidance with the basic sound SAb for the acceleration guidance when the sound parameter Psound is a positive and small value (when the sound parameter Psound is between a value near zero and a first threshold value), combining the additional sounds SA1 and SA2 for the acceleration guidance with the basic sound SAb for the acceleration guidance when the sound parameter Psound is a positive and medium value (when the sound parameter Psound is greater than or equal to the first threshold value and less than a second threshold value that is greater than the first threshold value), and combining additional sounds SA1, SA2, and SA3 for the acceleration guidance with the basic sound SAb for the acceleration guidance when the sound parameter Psound is positive and large (when the sound parameter Psound is greater than or equal to the second threshold value). In this way, it is possible to change a method in which the notification sound SA for the acceleration guidance echoes in accordance with an increase in the sound parameter Psound while limiting an excessively high frequency of the additional sound SAn for the acceleration guidance and allow the driver to perceive that the need for acceleration has increased.

(Option Control 3)

Figure 12:
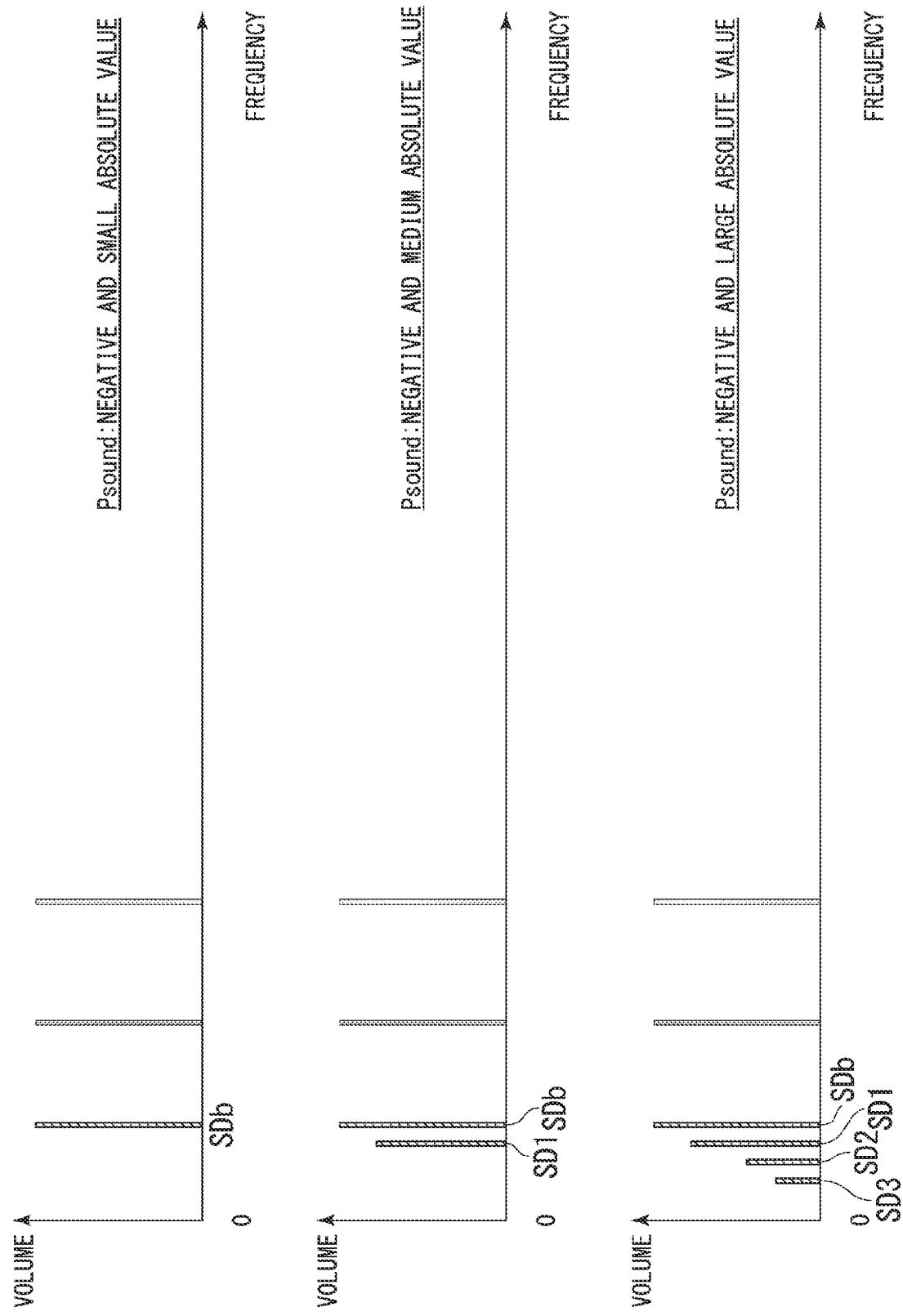
FIG. 12 is a diagram for describing option control 3.

When the sound parameter Psound is negative, the notification control unit 180 may increase the number of additional sounds SDm for the deceleration guidance having different frequencies as the absolute value of the sound parameter Psound increases. FIG. 12 is a diagram for describing option control 3. For example, the notification control unit 180 causes the speaker 60 to output a sound by combining the additional sound SD1 for the deceleration guidance with the basic sound SDb for the deceleration guidance when the sound parameter Psound is negative and has a medium absolute value (when the sound parameter Psound is less than or equal to a third threshold value and exceeds the second threshold value less than the third threshold value) and combining the additional sounds SD1, SD2, and SD3 for the deceleration guidance with the basic sound SDb for the deceleration guidance when the sound parameter Psound is negative and has a large absolute value (when the sound parameter Psound is less than or equal to the third threshold value) without combining the additional sound SDm for the deceleration guidance with the basic sound SDb for the deceleration guidance when the sound parameter Psound is negative and has a small absolute value (when the sound parameter Psound is between a value near zero and a negative third threshold value). In this way, it is possible to change a method in which the notification sound SD for the deceleration guidance echoes in accordance with a decrease in the sound parameter Psound while limiting an excessively low frequency of the additional sound SDm for the deceleration guidance and allow the driver to perceive that the need for deceleration has increased.

(Option Control 4)

Figure 13:
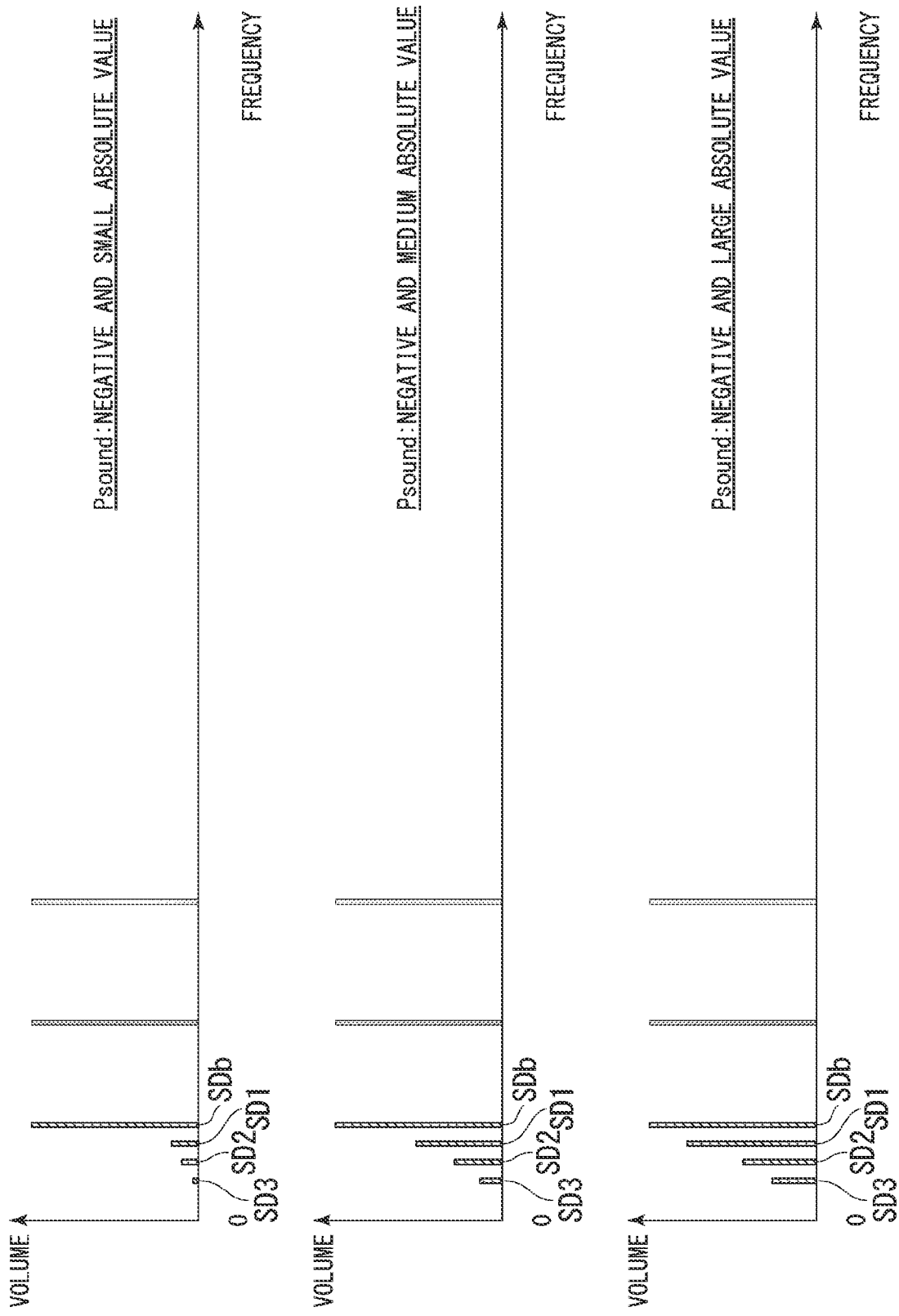
FIG. 13 is a diagram for describing option control 4.

When the sound parameter Psound is negative, the notification control unit 180 may increase the volume of the additional sound SDm for the deceleration guidance as the absolute value of the sound parameter Psound increases. FIG. 13 is a diagram for describing option control 4. For example, the notification control unit 180 causes the speaker 60 to output a sound by combining low-level additional sounds SD1 to SD3 for the deceleration guidance with the basic sound SDb for the deceleration guidance when the sound parameter Psound is negative and has a small absolute value (when the sound parameter Psound is between a value near zero and a negative third threshold), combining medium-level additional sounds SD1 to SD3 for the deceleration guidance with the basic sound SDb for the deceleration guidance when the sound parameter Psound is negative and has a medium absolute value (when the sound parameter Psound is less than or equal to the third threshold value and exceeds the second threshold value less than the third threshold value), and combining high-level additional sounds SD1 to SD3 for the deceleration guidance with the basic sound SDb for the deceleration guidance when the sound parameter Psound is negative and has a large absolute value (when the sound parameter Psound is less than or equal to the third threshold value). In this way, it is possible to change a method in which the notification sound SD for the deceleration guidance echoes in accordance with a decrease in the sound parameter Psound while limiting an excessively low frequency of the additional sound SDm for the deceleration guidance and allow the driver to perceive that the need for deceleration has increased. Also, when the sound parameter Psound is positive, the notification control unit 180 may increase the volume of the additional sound SAn for the acceleration guidance as the sound parameter Psound increases.

(Option Control 5)

Figure 14:
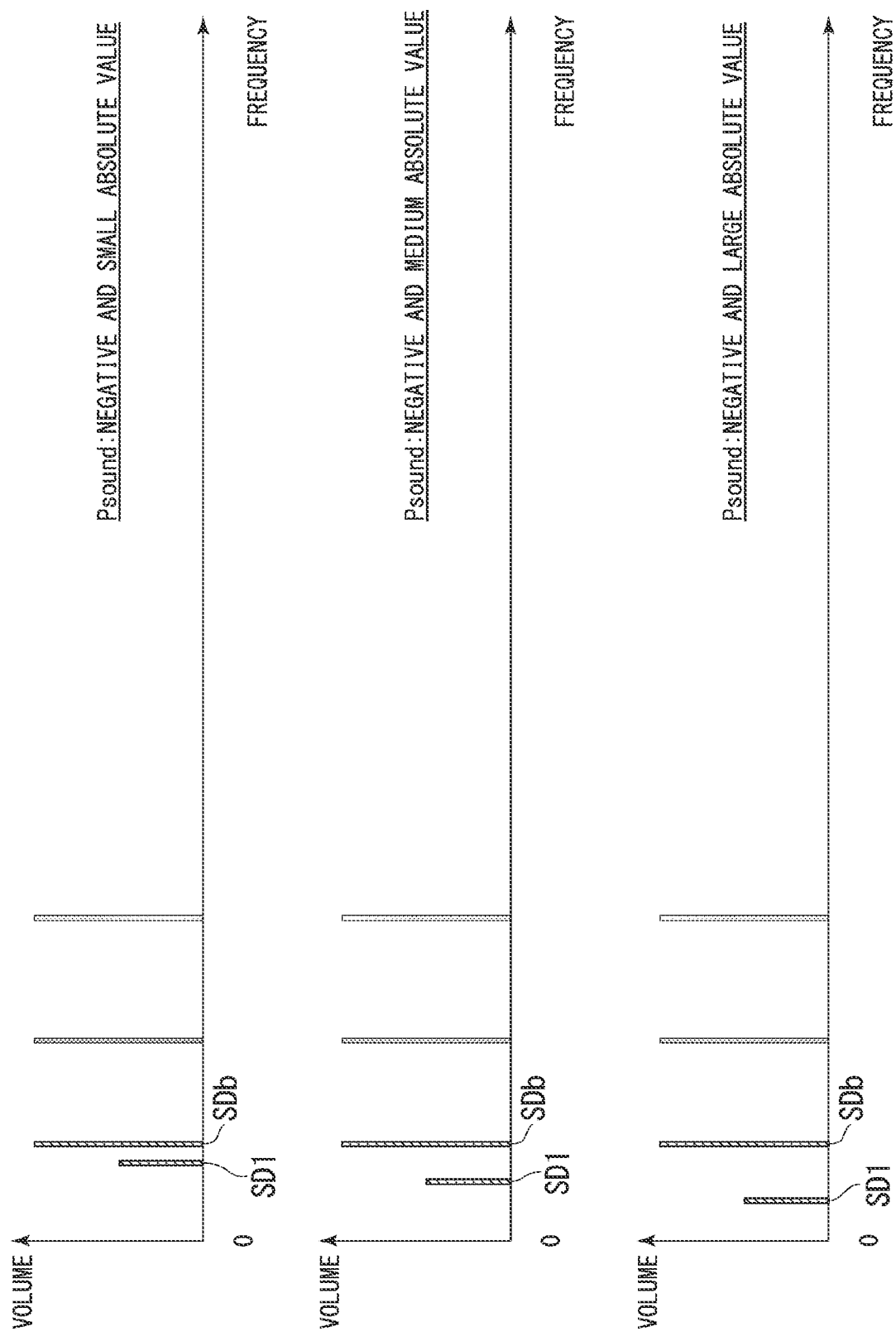
FIG. 14 is a diagram for describing option control 5.

When the sound parameter Psound is negative, the notification control unit 180 may shift the frequency of the additional sound SDm for the deceleration guidance away from the frequency of the basic sound SDb for the deceleration guidance as the absolute value of the sound parameter Psound increases. FIG. 14 is a diagram for describing option control 5. For example, the notification control unit 180 causes the speaker 60 to output a sound by combining the additional sound SD1 for the deceleration guidance having a frequency comparatively close to that of the basic sound SDb for the deceleration guidance with the basic sound SDb for the deceleration guidance when the sound parameter Psound is negative and has a small absolute value (when the sound parameter Psound is between a value near zero and a negative third threshold value), combining the additional sound SD1 for the deceleration guidance having a larger frequency difference from the basic sound SDb for the deceleration guidance as compared with the above with the basic sound SDb for the deceleration guidance when the sound parameter Psound is negative and has a medium absolute value (when the sound parameter Psound is less than or equal to the third threshold value and exceeds the second threshold value less than the third threshold value), and combining the additional sound SD1 for the deceleration guidance having a larger frequency difference from the basic sound SDb for the deceleration guidance as compared with the above with the basic sound SDb for the deceleration guidance when the sound parameter Psound is negative and has a large absolute value (when the sound parameter Psound is less than or equal to the third threshold value). In this way, it is possible to change a method in which the notification sound SD for the deceleration guidance echoes in accordance with a decrease in the sound parameter Psound while limiting an excessively low frequency of the additional sound SDm for the deceleration guidance and allow the driver to perceive that the need for deceleration has increased.

(Option Control 6)

Figure 15:
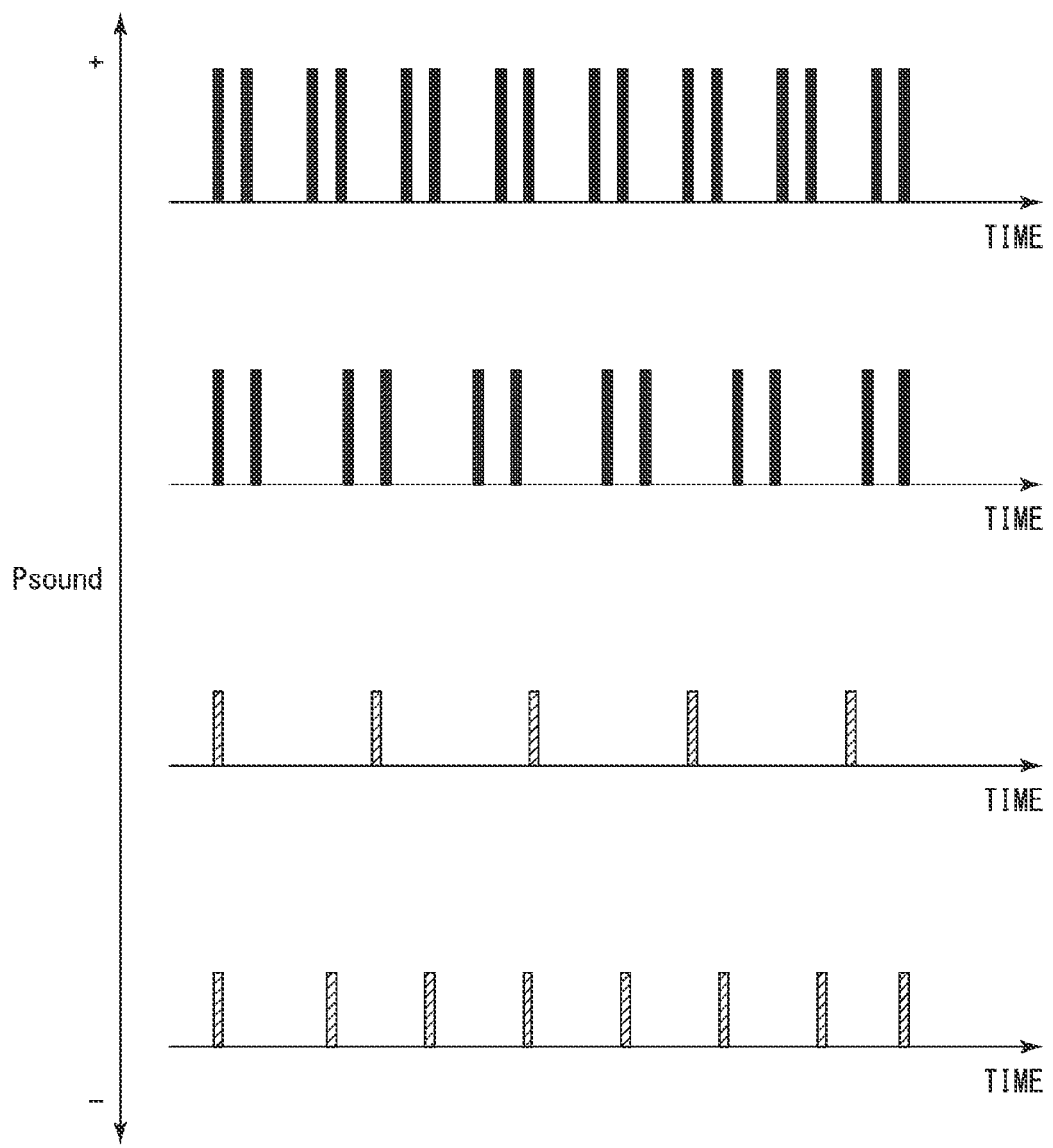
FIG. 15 is a diagram for describing option control 6.

The notification control unit 180 may change an interval between notification sounds according to whether the sound parameter Psound is positive or negative. Also, the notification control unit 180 may change the interval between the notification sounds in accordance with an absolute value of the sound parameter Psound. FIG. 15 is a diagram for describing option control 6. For example, the notification control unit 180 may set the interval between the notification sounds as an unequal interval when the sound parameter Psound is positive and may set the interval between the notification sounds as an equal interval when the sound parameter Psound is negative. Also, the notification control unit 180 may gradually decrease the interval between the notification sounds as the absolute value of the sound parameter Psound increases. In this way, a notification sound that sounds like "tutut-tutut" is output when the sound parameter Psound is positive and a notification sound that sounds like "dot-dot" is output when the sound parameter Psound is negative. As a result, it becomes easy for the driver to distinguish whether the notification sound is positive or negative.

(Example of Total Control)

Figure 16:
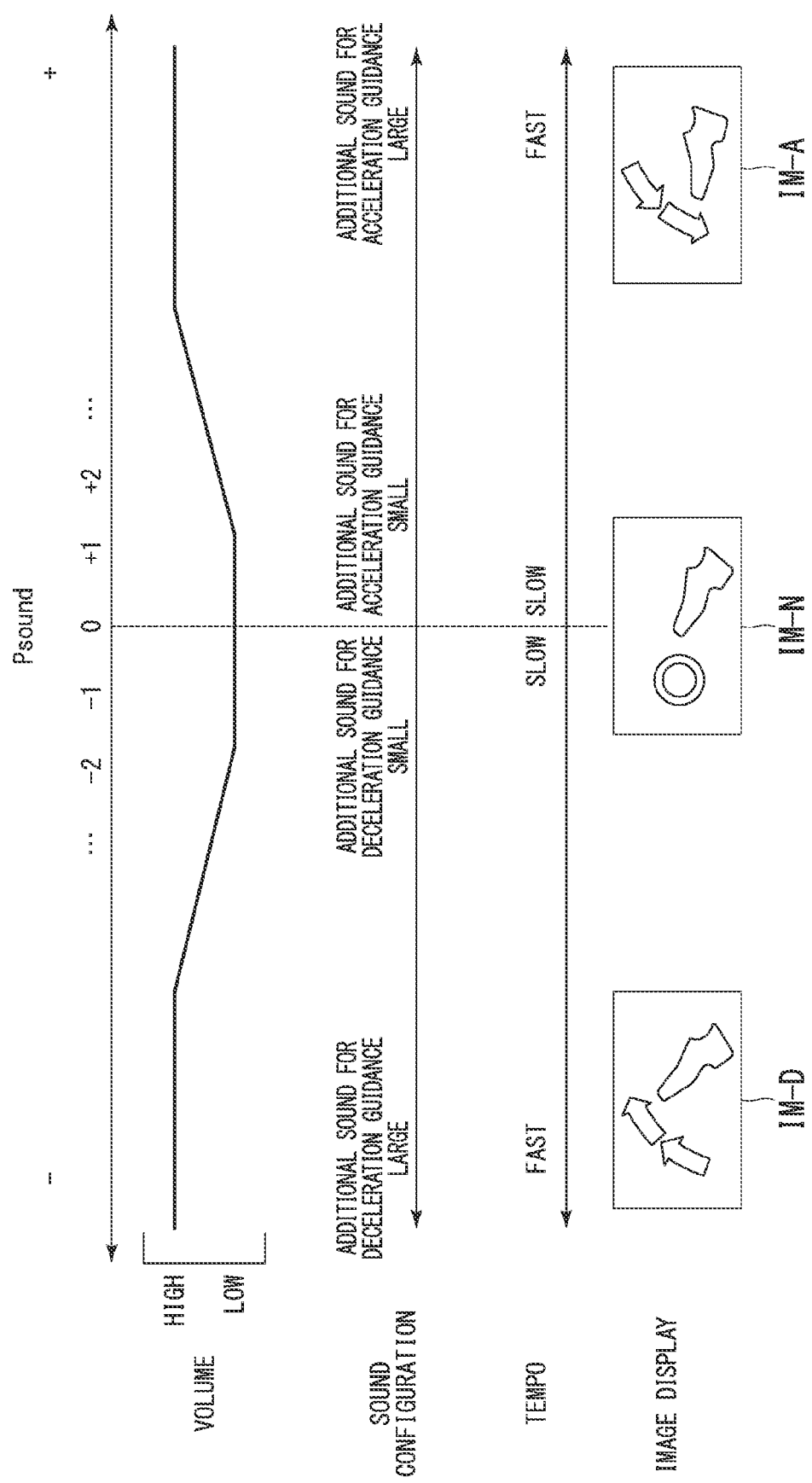
FIG. 16 is a diagram showing an example of an overview of control performed by the notification control unit.

By appropriately combining the option control processes described above, for example, the following control processes are performed. FIG. 16 is a diagram showing an example of an overview of a control process performed by the notification control unit 180. For example, when the sound parameter Psound is in a range near zero, the notification control unit 180 minimizes the volume of the notification sound and also reduces the number of additional sounds for the acceleration guidance and the number of additional sounds for the deceleration guidance. At this time, the notification control unit 180 causes the display device 70 to display an image IM-N indicating that acceleration/deceleration is unnecessary.

As the sound parameter Psound is positive and the sound parameter Psound increases, the notification control unit 180 increases the volume of the notification sound, increases the additional sound for the acceleration guidance, and speeds up the tempo of the notification sound. At this time, the notification control unit 180 causes the display device 70 to display an image IM-A for prompting the driver to perform acceleration. The notification control unit 180 may be configured to uniformly maintain the volume of the notification sound when the sound parameter Psound increases and reaches a certain value and exclusively increase the additional sound for the acceleration guidance when the sound parameter Psound further increases.

As the sound parameter Psound is negative and the absolute value of the sound parameter Psound increases, the notification control unit 180 increases the volume of the notification sound, increases the additional sound for the deceleration guidance, and speeds up the tempo of the notification sound. At this time, the notification control unit 180 causes the display device 70 to display an image IM-D for prompting the driver to perform deceleration. The notification control unit 180 may be configured to uniformly maintain the volume of the notification sound when the absolute value of the sound parameter Psound increases and reaches a certain value and increase the additional sound for the deceleration guidance when the absolute value of the sound parameter Psound further increases.

[Start Timing and Like]

Figure 17:
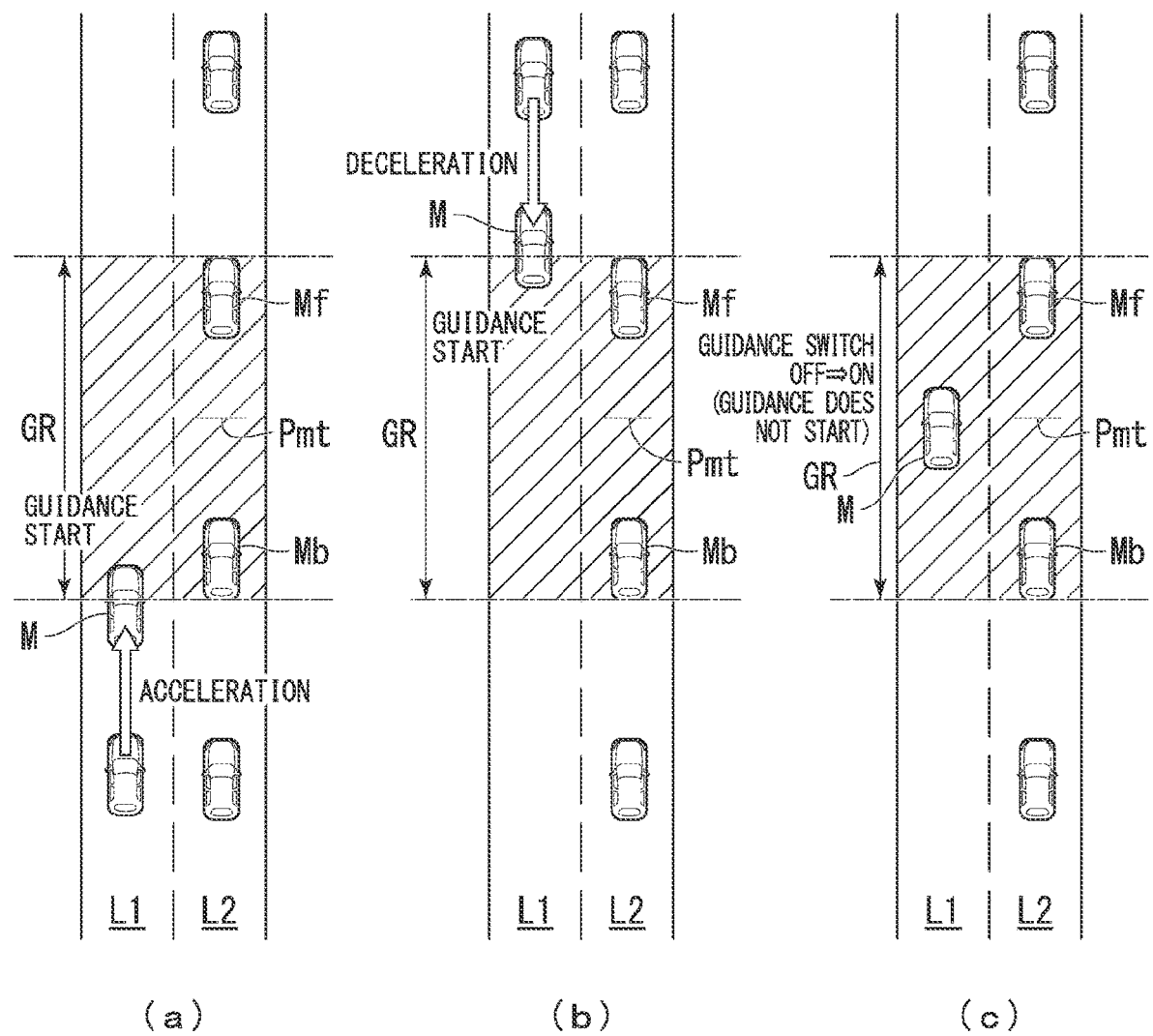
FIG. 17 is a diagram showing a guidance start range associated with a notification sound.

FIG. 17 is a diagram showing a guidance start range GR associated with the notification sound. In the present embodiment, the notification control unit 180 starts the output of the notification sound in accordance with the entry of the vehicle M into the guidance start range GR between the front portion (for example, the front end) of the forward vehicle Mf traveling immediately in front of the target position Pmt and the rear portion (for example, the rear end) of the rearward vehicle Mb traveling immediately behind the target position Pmt in the vehicle traveling direction.

For example, the notification control unit 180 starts the output of the notification sound when the vehicle M has entered the guidance start range GR from the rear as shown in (a) of FIG. 17 and when the vehicle M has entered the guidance start range GR from the front as shown in (b) of FIG. 17. This is because, when the vehicle M is positioned in front of the front portion (for example, the front end) of the forward vehicle Mf or when the vehicle M is positioned behind the rear portion of the rearward vehicle Mb, the forward vehicle Mf and the rearward vehicle Mb are detected by the acquisition unit 110 in a state in which they overlap and the accuracy of recognition of the positions and velocities of the forward vehicle Mf and the rearward vehicle Mb is lowered.

On the other hand, the notification control unit 180 does not start the output of a notification sound when an input operation is performed by the driver who desires to be guided for merging in a state in which the vehicle is positioned at the side of the target position Pmt as shown in (c) of FIG. 17. In this case, the driving assistance device 100 takes action such as notifying the driver that it is necessary to re-enter the guidance start range GR or changing the target position Pmt. This is because the vehicle M of the present embodiment may have a blind spot area DA at its side as described above. Also, when the vehicle M has a group of monitoring sensors that can detect situations at 360 degrees around the vehicle M, the output of the notification sound may be started even from the state shown in (c) of FIG. 17.

When the vehicle M has entered the guidance start range GR, the notification control unit 180 causes the speaker 60 to output a guidance start notification sound different from the notification sound before the output of the notification sound is started. The guidance start notification sound may be a voice announcement such as "Guidance will start."

The notification control unit 180 determines a steering timing for entering the second lane L2. For example, when a position error of the vehicle M for the target position Pmt is within a predetermined range and a velocity error of the vehicle M for the target merging velocity Vmt is within a predetermined range, the steering determination unit 111 determines that the steering timing has been reached.

The notification control unit 180 causes the speaker 60 to output a steering instruction sound different from the notification sound at the determined steering timing. The steering instruction sound may be a specific sound output from the speaker 60 (for example, a "ping" sound) or a voice announcement such as "Merging is possible" or "Please turn the steering wheel."

The notification control unit 180 determines whether or not the vehicle can enter the second lane L2. An entry permission/inhibition determination unit 112 determines that entry into the second lane L2 is impossible, for example, when a predetermined condition such as a condition that the inter-vehicle distance between the forward vehicle Mf and the rearward vehicle Mb is less than a predetermined distance is satisfied.

When it is determined that it is impossible to enter the second lane L2 after starting to output the notification sound, the notification control unit 180 causes the speaker 60 to output a guidance stop notification sound that is different from the notification sound. The guidance stop notification sound may be a specific sound output from the speaker 60 (for example, a warning sound such as "boo") or a voice announcement such as "Please stop merging" or "Let's move to the rear of the rearward vehicle."

[Processing Flow]

Figure 18:
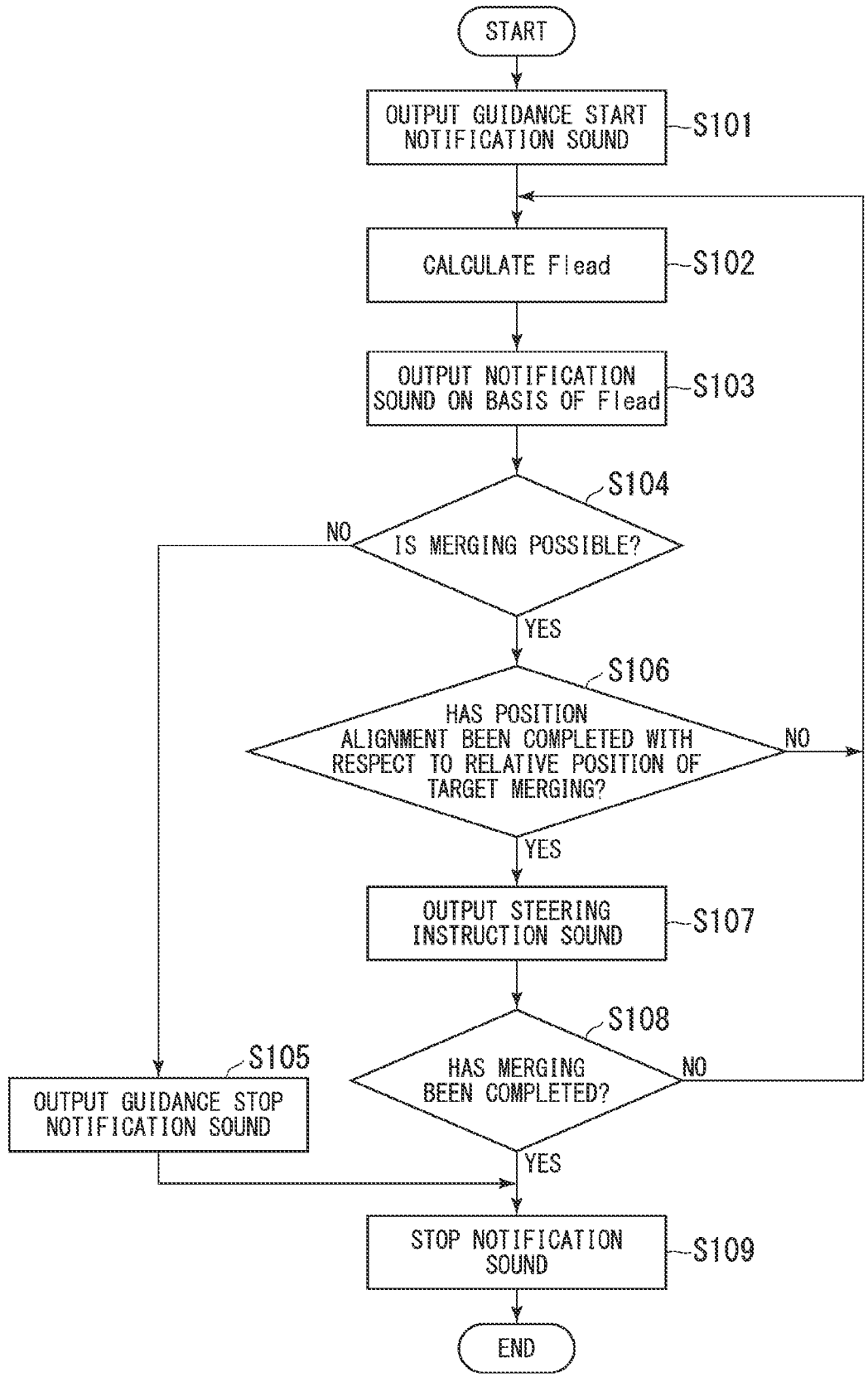
FIG. 18 is a flowchart showing an example of a flow of a control process of the driving assistance device.

FIG. 18 is a flowchart showing an example of a flow of a control process of the driving assistance device 100. Here, it is assumed that the driver's input for starting the guidance has been performed and the vehicle M has entered the guidance start range GR.

When the vehicle M has entered the guidance start range GR, the notification control unit 180 causes a guidance start notification sound to be output before the notification sound is output (S101). Subsequently, the notification control unit 180 calculates the guidance parameter Flead (S102). The notification control unit 180 decides on the sound parameter Psound on the basis of the guidance parameter Flead and causes a notification sound corresponding to the decided sound parameter Psound to be output (S103).

Subsequently, the notification control unit 180 determines whether or not merging is possible (S104). When it is determined that merging is impossible (S104), a guidance stop notification sound is output (S105). The notification control unit 180 stops the output of the notification sound (S109) and ends a series of processing steps.

When it is determined that merging is possible in step S104, the notification control unit 180 determines whether or not the position alignment of the vehicle M with the target position Pmt has been completed, i.e., whether or not the timing is a steering timing for entering the second lane (S106). When the notification control unit 180 determines that the position alignment of the vehicle M with the target position Pmt has not been completed, the process returns to S102. On the other hand, when the notification control unit 180 determines that the position alignment of the vehicle M with the target position Pmt has been completed, the notification control unit 180 causes the speaker 60 to output a steering instruction sound (S107).

Subsequently, the notification control unit 180 determines whether or not the merging has been completed (S108). When the notification control unit 180 determines that the merging has not been completed (for example, when the driver has not performed steering), the process returns to S102. On the other hand, when it is determined that the merging has been completed (S108), the notification control unit 180 stops the output of the notification sound (S109) and ends the series of processing steps.

[Adjustment of Guidance Parameter According to Driver's Characteristics]

The notification control unit 180 may perform the following process. The notification control unit 180 changes a change in the sound parameter Psound for the guidance parameter Flead (hereinafter referred to as an inclination α) in accordance with the driver's characteristics. For example, even if the same notification sound has been heard, an amount of depression of the accelerator pedal 31 is likely to significantly differ according to the driver. Therefore, the notification control unit 180 changes (adjusts) the notification sound in accordance with the depression characteristics of the accelerator pedal 31 for each driver. In other words, the notification control unit 180 changes the setting of the inclination α for each driver such that the driver depresses the accelerator pedal 31 to an amount of depression for obtaining a required driving force.

Figure 19:
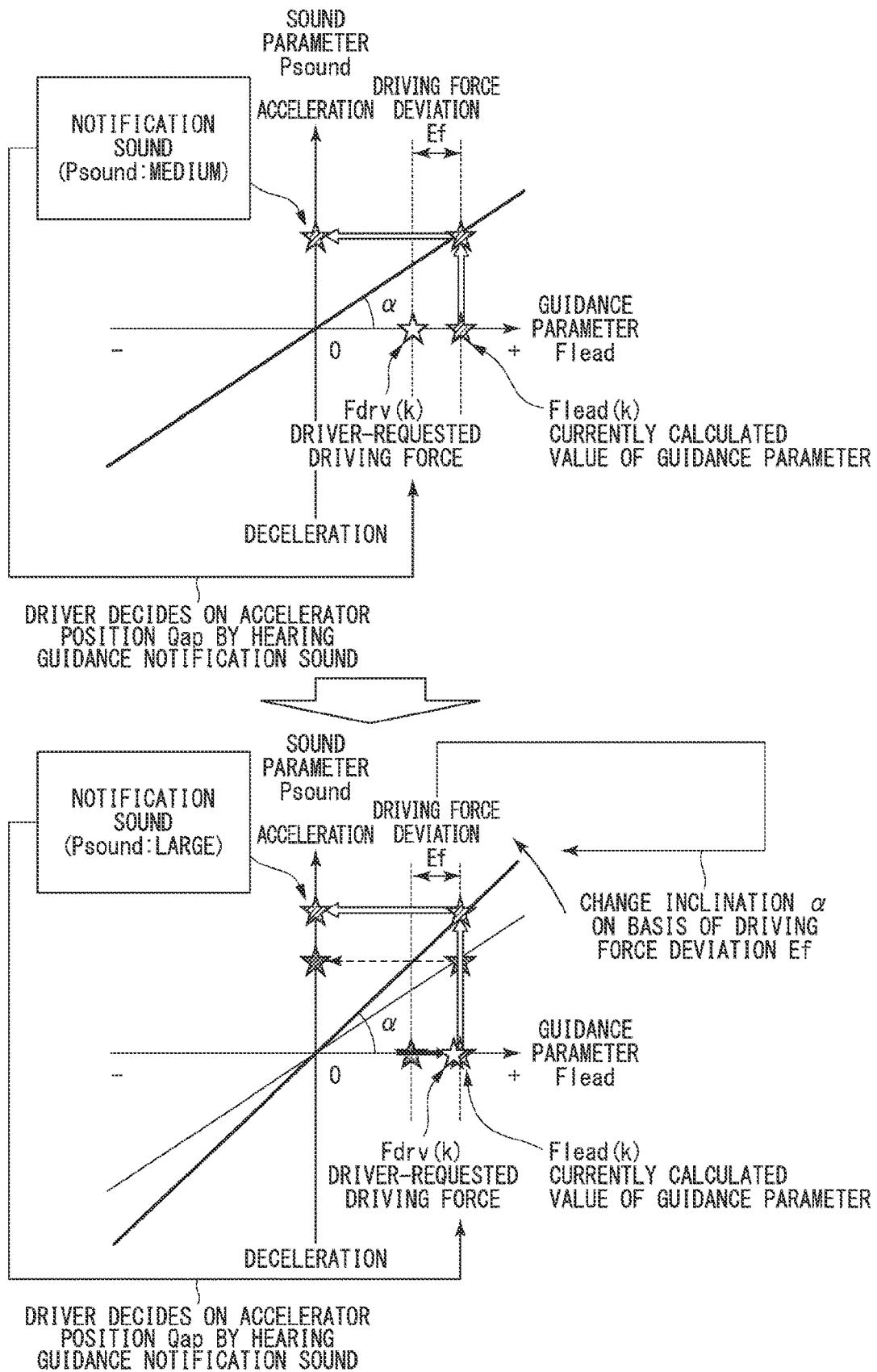
FIG. 19 is a diagram conceptually showing a change in an inclination.

FIG. 19 is a diagram conceptually showing changes in the inclination α. The notification control unit 180 first identifies the sound parameter Psound on the basis of a currently calculated value (for example, an initial value) of the guidance parameter Flead, and outputs a notification sound corresponding to the identified sound parameter Psound. As a result, the driver displaces the accelerator pedal 31 in response to the notification sound.

Next, the driver-requested driving force calculation unit 136 calculates the driver-requested driving force Fdry after responding to the notification sound on the basis of the most recent accelerator position Qap of the accelerator pedal 31 and outputs the calculated driver-requested driving force Fdry to the notification control unit 180. The notification control unit 180 compares a received difference between the driver-requested driving force Fdry and the target merging driving force Fdt with the guidance parameter Flead and determines whether or not there is driving force deviation Ef (=Fdrv−Fdt−Flead), which is the difference of the guidance parameter Flead for the difference between the driver requested driving force Fdry and the target merging driving force Fdt.

When the driving force deviation Ef is present, the notification control unit 180 changes the inclination α such that the driving force deviation Ef is eliminated. For example, when the driver-requested driving force Fdry is small with respect to a currently calculated value of the guidance parameter Flead, the inclination α is changed such that the notification sound interval is shortened even if the same guidance parameter Flead is input (i.e., the notification sound becomes a notification sound for requesting a higher driving force). The notification control unit 180 iterates a process of changing (adjusting) the inclination α described above at predetermined intervals. Thereby, an appropriate inclination α can be obtained for each driver. The notification control unit 180 registers the inclination α obtained for each driver in the driver characteristic information 210 and uses the registered inclination α from the next time.

Figure 20:
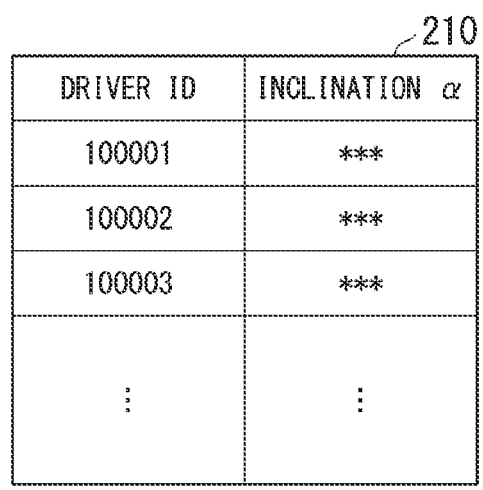
FIG. 20 is a diagram showing an example of driver characteristic information.

FIG. 20 is a diagram showing an example of driver characteristic information 210. In the driver characteristic information 210, an identification ID of the driver and an inclination α obtained for each driver are associated and registered. When the inclination α corresponding to the driver ID determined by the driver determination unit 170 is registered in the driver characteristic information 210, the notification control unit 180 reads the inclination α from the driver characteristic information 210 and calculates the sound parameter Psound using the read inclination α. Thereby, it is possible to output a notification sound corresponding to the depression characteristic of each driver.

The process of changing the inclination α corresponding to the driver's characteristics described above is performed, for example, on the basis of the following Eqs. (7) to (9). Psound denotes a sound parameter, α denotes an inclination of the sound parameter, Ef denotes driving force deviation, and Ksnd denotes a sound parameter adaptive gain (0<Ksnd).

$$P\text{sound}(k) = \alpha(k) \cdot F\text{lead}(k) \quad (7)$$

$$Ef(k) = Fdrv(k) - Fdt(k) - F\text{lead}(k) \quad (8)$$

$\alpha(k)=\alpha(k-1)-Ksnd\cdot Ef(k)$(at the time of guidance execution) or $=\alpha(k-1)$(at the time of non-guidance execution) (9)

According to the first embodiment described above, it is possible to provide the driver with guidance content that is easier to understand.

In the first embodiment, the guidance parameter Flead may be calculated using a simpler calculation model. For example, the merging guidance control unit 144 may calculate the guidance feedback driving force Ffb on the basis of a model (for example, a simpler model) different from the response-designated control.

Second Embodiment

Next, a second embodiment will be described. The present embodiment is different from the first embodiment in that a sound parameter Psound' is identified on the basis of relative position deviation Ept instead of the guidance parameter Flead. Configurations other than configurations to be described below are similar to those of the first embodiment.

For example, the notification control unit 180 causes the speaker 60 to output notification sounds with different pitches when the position is excessively behind the target position Pmt (i.e., when acceleration is necessary) or when the position is excessively in front of the target position Pmt (i.e., when deceleration is necessary). That is, the notification control unit 180 uses relative position deviation Ept instead of the guidance parameter Flead.

According to the second embodiment described above, like the first embodiment, it is possible to provide the driver with guidance content that is easier to understand.

Third Embodiment

Figure 21:
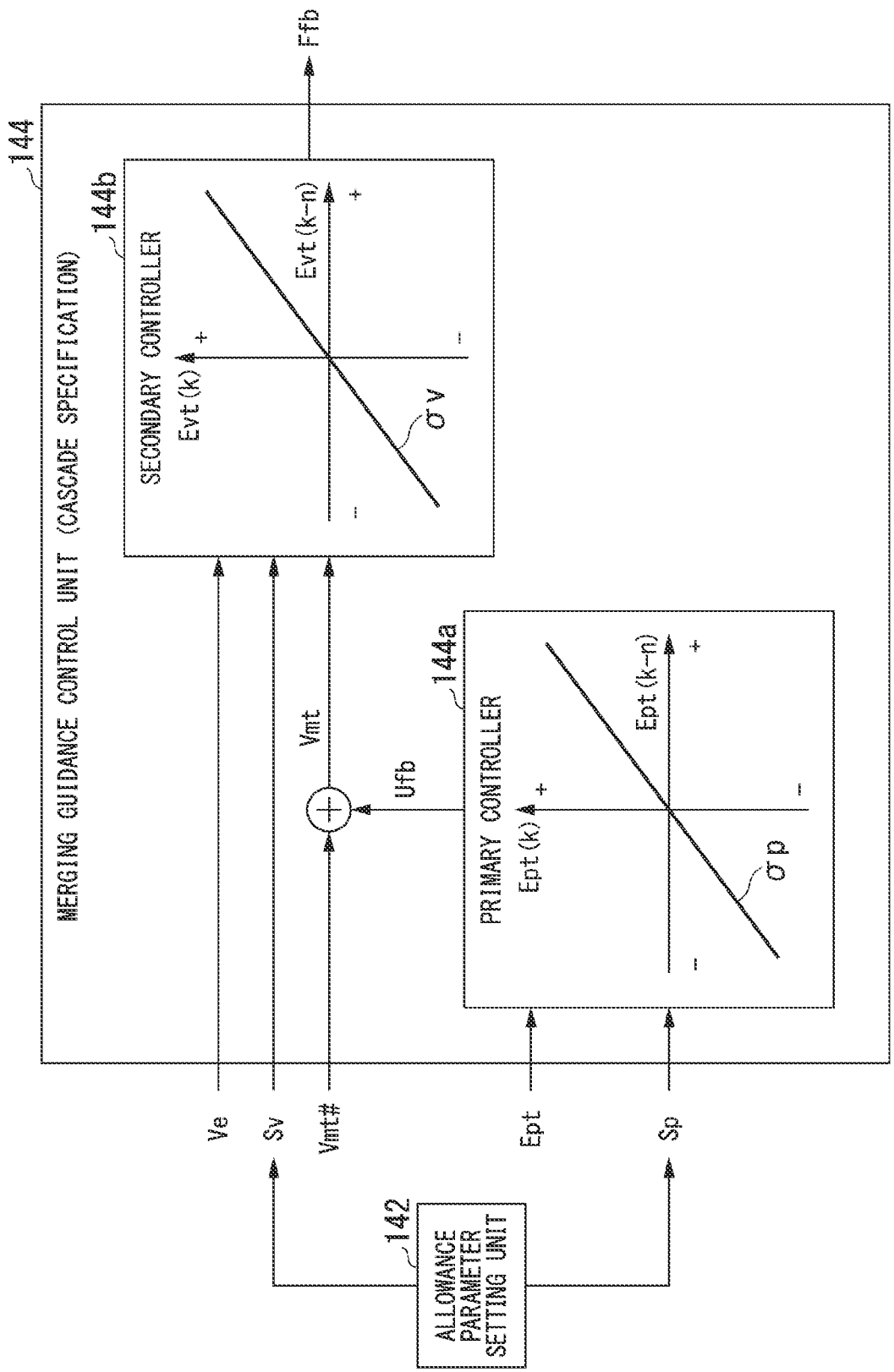
FIG. 21 is a diagram schematically showing functions of a merging guidance control unit and an allowance parameter setting unit according to a third embodiment.

FIG. 21 is a diagram schematically showing functions of the merging guidance control unit 144 and the allowance parameter setting unit 142 according to a third embodiment. The merging guidance control unit 144 includes a primary controller 144a and a secondary controller 144b. The primary controller 144a functions as a position controller and the secondary controller 144b functions as a velocity controller.

The primary controller 144a decides on an amount of correction Ufb for a target merging velocity Vmt of the vehicle M such that the relative position deviation Ept(k) and the past value Ept(k−n) of the relative position deviation approach zero in a state in which a first switching function σp(k) obtained by linearly combining the relative position deviation Ept(k) with the past value Ept(k−n) of the relative position deviation approaches zero. n is a natural number. Accordingly, Ept(k−n) denotes a value of a (k−n)$^{th}$ control cycle. The first switching function σp(k) is represented by Eq. (10). Sp(k) is a first guidance parameter and is set in a range of $-1<Sp(k)<0$.

$\sigma p(k)=Ept(k)+Sp(k)\cdot Ept(k-n)$ (10)

The primary controller 144a calculates the amount of correction Ufb on the basis of, for example, Eqs. (11) to (13). In the equations, Urch(k) denotes an arrival rule input for position control, Uadp(k) denotes an adaptation rule input for position control, and Krch_p and Kadp_p denote feedback gains.

$Urch(k)=Krch\_p\cdot \sigma p(k)$ (11)

$Uadp(k)=Kadp\_p\cdot \sigma p(k)+Uadp(k-1)$ (12)

$Ufb(k)=Urch(k)+Uadp(k)$ (13)

The merging guidance control unit 144 decides on the target merging velocity Vmt by correcting the provisional target merging velocity Vmt #based on one or both of the velocity Vof of the forward vehicle Mf and the velocity Vob of the rearward vehicle Mb with the amount of correction Ufb(k). The target velocity deviation Evt(k) in the third embodiment is a difference between the corrected target merging velocity Vmt and the velocity Ve.

The secondary controller 144b calculates the guidance feedback driving force Ffb(k) such that the target velocity deviation Evt(k) and the past value Evt(k−m) of the target velocity deviation approach zero while a second switching function σv(k) obtained by linearly combining the target velocity deviation Evt(k) with the past value Evt(k−m) of the target velocity deviation approaches zero. m is a natural number. Accordingly, Evt(k−m) denotes a value of a (k−m)$^{th}$ control cycle. The second switching function σv(k) is represented by Eq. (14). Sv(k) is a second guidance parameter and is set in a range of $-1<Sv(k)<0$. Here, n and m may be the same value, but the convergence velocity of velocity control can be adjusted to be faster than the convergence velocity of position control by setting n>m.

$\sigma v(k)=Evt(k)+Sv(k)\cdot Evt(k-m)$ (14)

The secondary controller 144b calculates the guidance feedback driving force Ffb on the basis of, for example, Eqs. (15) to (17). In the equations, Frch(k) denotes an arrival rule input for velocity control, Fadp(k) denotes an adaptation rule input for velocity control, and Krch_v and Kadp_v denote feedback gains.

$Frch(k)=Krch\_v\cdot \sigma v(k)$ (15)

$Fadp(k)=Kadp\_v\ \sigma v(k)+Fadp(k-1)$(at the time of guidance execution) or $=-Fdrv(k)-Fff(k)-Ffb(k)$ (at the time of non-guidance execution) (16)

$Ffb(k)=Frch(k)+Fadp(k)$ (17)

The guidance feedback driving force Ffb is added to the feedforward driving force Fff and is output as the guidance parameter Flead to the notification control unit 180. Although the relative position deviation Ept and the target velocity deviation Evt can be made close to zero substantially simultaneously as in the first embodiment by calculating the guidance feedback driving force Ffb as described above, a process of making the relative position deviation Ept close to zero is implemented to be slightly faster, resulting in slight target velocity deviation Evt at that time, as compared with the first embodiment. Thus, although it is possible to cause the vehicle M to reach the vicinity of the target position Pmt more quickly than in the first embodiment, the acceleration/deceleration felt by the occupant is increased. Also, because the third embodiment has the property that the control does not oscillate even if the feedback gain is increased as compared with the first embodiment, this also enables the vehicle M to reach the vicinity of the target position Pmt more quickly than in the first embodiment in a similar way.

The allowance parameter setting unit 142 sets at least a first guidance parameter Sp(k) on the basis of a traveling environment of the vehicle M. For example, as in the first embodiment, the allowance parameter setting unit 142 acquires course information RI from the acquisition unit 110 and sets the first guidance parameter Sp(k) such that the absolute value of the first guidance parameter Sp(k) increases as an available merging distance included in the course information RI increases and the absolute value of the first guidance parameter Sp(k) decreases as an available merging distance decreases. Thereby, when the remaining distance to the merging is short, the relative position deviation Ept(k) can be preferentially set to zero and fast merging can be implemented. On the other hand, when the available merging distance is sufficiently long, merging control that prioritizes riding comfort and suppresses acceleration/deceleration is performed by increasing the absolute value of the first guidance parameter Sp(k).

The allowance parameter setting unit 142 may set the second guidance parameter Sv(k) to a fixed value or may set the second guidance parameter Sv(k) to a variable value that fluctuates in accordance with a change in the first guidance parameter Sp(k).

According to the above-described third embodiment, smoother velocity adjustment can be performed and control that prioritizes position alignment can be performed as compared to the first embodiment.

In the third embodiment, the secondary controller 144b may perform control using an equivalent control input. It is assumed that the function of the primary controller 144a is similar to that of the third embodiment. The secondary controller 144b in the modified example of the third embodiment calculates the guidance feedback driving force Ffb, for example, on the basis of Eqs. (15), (16), and (18) described above. Frch(k) in Eq. (21) denotes an arrival rule input for velocity control, Fadp(k) denotes an adaptation rule input for velocity control, and Feq(k) denotes an equivalent control input. The equivalent control input Feq(k) is expressed by Eq. (19) using a temporary target merging velocity Vmt #. The equivalent control input Feq(k) is the term that acts to limit the switching function σv(k) to zero (in other words, to limit the target velocity deviation Evt(k−m) and the target velocity deviation Evt(k) to a control line where the switching function σv(k) is zero) after the switching function σv(k) reaches zero. By including the equivalent control input Feq(k) in calculation, the feedback gain can be increased, resulting in faster merging. M in Eq. (19) denotes a vehicle weight of the vehicle M and ΔT denotes a control interval (for example, several tens of milliseconds [ms] to several hundreds of milliseconds [ms]).

$$Ffb(k)=Frch(k)+Fadp(k)+Feq(k) \quad (18)$$

$$Feq(k)=(M/\Delta T) \times \{-Sv(k) \times Ve(k)+Sv(k) \times Ve(k-1)\}+(Sv(k)+1) \times Vmt\#(k)-(Sv(k)+1) \times Vmt\#(k-1)\} \quad (19)$$

The principle of determining the equivalent control input Feq(k) as described above will be described. Because the target merging velocity Vmt(k+1) in a subsequent control cycle is required in principle but cannot be calculated in Feq(k), it is necessary to delay the target merging velocity Vmt for use in the calculation of the target velocity deviation Evt and the calculation of the equivalent control input Feq(k) by one control cycle. Ideally, the target merging velocity Vmt for use in the calculation of the equivalent control input Feq(k) should be the target merging velocity Vmt obtained by correcting the temporary target merging velocity Vmt #by the amount of correction Ufb(k) in the primary controller 144a.

If the equivalent control input Feq(k) is determined using the target merging velocity Vmt(k+1) in the subsequent control cycle, Eq. (21) is obtained in a state in which Eq. (20) is assumed. If the control cycle is shifted to a previous control cycle such that the target merging velocity Vmt(k+1) of the subsequent control cycle is eliminated from this equation, Eq. (22) is obtained.

$$Evt(k)=Ve(k)-Vmt(k-1) \quad (20)$$

$$Feq(k)=(M/\Delta T) \times \{-Sv(k) \times Ve(k)+Sv(k) \times Ve(k-1)\}+Vmt(k+1)+(Sv(k)-1) \times Vmt(k)-Sv(k) \times Vmt(k-1)\} \quad (21)$$

$$Feq(k)=(M/\Delta T) \times -Sv(k) \times Ve(k)+Sv(k) \times Ve(k-1)+Vmt(k)+(Sv(k)-1) \times Vmt(k-1)-Sv(k) \times Vmt(k-2)\} \quad (22)$$

However, when merging control is performed using the equivalent control input Feq(k) obtained by Eq. (22), the primary controller 144a and the secondary controller 144b resonate due to a delay of the merging velocity target value Vmt and an influence of a feedforward control action change based on the equivalent control input Feq(k) and the control of position and velocity diverges.

Consequently, in a state in which Eq. (23) is assumed without the delay of one control cycle of the target merging velocity Vmt when the target velocity deviation Evt(k) is calculated, a future merging target velocity is set using the predicted value Vmt #(k+1) of the temporary merging target velocity Vmt #described above and the equivalent control input Feq(k) is determined by Eq. (24).

$$Evt(k)=Ve(k)-Vmt(k) \quad (23)$$

$$Feq(k)=(M/\Delta T) \times -Sv(k) \times Ve(k)+Sv(k) \times Ve(k-1)+Vmt\#(k+1)+(Sv(k)-1) \times Vmt\#(k-2)-Sv(k) \times Vmt\#(k-3) \quad (24)$$

Here, if ΔVmt #(k)=Vmt #(k)—Vmt #(k−1) is defined, the predicted value Vmt #(k+1) of the temporary merging target velocity Vmt #can be represented by Vmt #(k)+ΔVmt #(k+1) and approximated as Vmt #(k)+ΔVmt #(k). According to this relationship, Vmt #(k+1)=2×Vmt #(k)−Vmt #(k−1). When Eq. (24) is rearranged using this, the above-described Eq. (19) is obtained.

Thus, it is possible to perform velocity adjustment and position alignment more quickly while preventing the divergence of control by deciding on the equivalent control input using a temporary merging target velocity Vm#before a correction process of the primary controller 144a.

Although modes for carrying out the present invention have been described above using embodiments, the present invention is not limited to the embodiments and various modifications and substitutions can also be made without departing from the scope and spirit of the present invention.

What is claimed is:

1. A driving assistance device comprising:
   a storage device configured to store a program; and
   a processor connected to the storage device,
   wherein the processor executes the program stored in the storage device to:
   acquire information about a target position decided on as a position relative to another moving object located in a second lane when a host moving object merges or changes lanes from a first lane to the second lane; and
   cause a speaker to output a sound obtained by combining a basic sound for acceleration guidance with an additional sound for the acceleration guidance having a higher frequency than the basic sound for the acceleration guidance when the host moving object should accelerate such that position alignment related to a traveling direction of the host moving object is performed with respect to the target position,
   wherein the additional sound for the acceleration guidance includes a plurality of sounds having frequencies different from each other.

2. The driving assistance device according to claim 1,
   wherein the processor causes the speaker to output a sound obtained by combining the basic sound for the acceleration guidance with the additional sound for the acceleration guidance that is an inter-order harmonic sound having a multiple of a frequency of the basic sound for the acceleration guidance.

3. The driving assistance device according to claim 1, wherein the processor calculates a degree to which the host moving object should accelerate such that the position alignment related to the traveling direction of the host moving object is performed with respect to the target position, and
wherein the number of sounds having frequencies different from each other increases as the degree to which the host moving object should accelerate increases.

4. The driving assistance device according to claim 1, wherein the processor calculates a degree to which the host moving object should accelerate such that the position alignment related to the traveling direction of the host moving object is performed with respect to the target position, and
wherein the processor causes a volume of the additional sound for the acceleration guidance to increase as the degree to which the host moving object should accelerate increases.

5. The driving assistance device according to claim 1, wherein the processor calculates a degree to which the host moving object should accelerate such that the position alignment related to the traveling direction of the host moving object is performed with respect to the target position, and
wherein the processor increases a frequency of the basic sound for the acceleration guidance as the degree to which the host moving object should accelerate increases.

6. The driving assistance device according to claim 1, wherein the processor causes the speaker to output a sound obtained by combining a basic sound for deceleration guidance with an additional sound for the deceleration guidance having a lower frequency than the basic sound for the deceleration guidance when the host moving object should decelerate such that the position alignment related to the traveling direction of the host moving object is performed with respect to the target position.

7. The driving assistance device according to claim 6, wherein the processor causes the speaker to output a sound at unequal intervals when the host moving object should accelerate such that the position alignment related to the traveling direction of the host moving object is performed with respect to the target position, and
wherein the processor causes the speaker to output a sound at equal intervals when the host moving object should decelerate such that the position alignment related to the traveling direction of the host moving object is performed with respect to the target position.

8. A driving assistance device comprising:
a storage device configured to store a program; and
a processor connected to the storage device,
wherein the processor executes the program stored in the storage device to:
acquire information about a target position decided on as a position relative to another moving object located in a second lane when a host moving object merges or changes lanes from a first lane to the second lane; and
cause a speaker to output a sound obtained by combining a basic sound for deceleration guidance with an additional sound for the deceleration guidance having a lower frequency than the basic sound for the deceleration guidance when the host moving object should decelerate such that position alignment related to a traveling direction of the host moving object is performed with respect to the target position,
wherein the additional sound for the deceleration guidance includes a plurality of sounds having frequencies different from each other.

9. The driving assistance device according to claim 8, wherein the processor causes the speaker to output a sound obtained by combining the basic sound for the deceleration guidance with the additional sound for the deceleration guidance having a frequency different from a frequency that is $1/n$ times a frequency of the basic sound for the deceleration guidance.

10. The driving assistance device according to claim 8, wherein the processor calculates a degree to which the host moving object should decelerate such that the position alignment related to the traveling direction of the host moving object is performed with respect to the target position, and
wherein the number of additional sounds for the deceleration guidance having frequencies different from each other increases as the degree to which the host moving object should decelerate increases.

11. The driving assistance device according to claim 8, wherein the processor calculates a degree to which the host moving object should decelerate such that the position alignment related to the traveling direction of the host moving object is performed with respect to the target position, and
wherein the processor causes a volume of the additional sound for the deceleration guidance to increase as the degree to which the host moving object should decelerate increases.

12. The driving assistance device according to claim 8, wherein the processor calculates a degree to which the host moving object should decelerate such that the position alignment related to the traveling direction of the host moving object is performed with respect to the target position, and
wherein the processor causes a frequency of the additional sound for the deceleration guidance to be further from a frequency of the basic sound for the deceleration guidance as the degree to which the host moving object should decelerate increases.

13. The driving assistance device according to claim 8, wherein the processor calculates a degree to which the host moving object should accelerate such that the position alignment related to the traveling direction of the host moving object is performed with respect to the target position, and
wherein the processor lowers a frequency of the basic sound for the deceleration guidance as the degree to which the host moving object should decelerate increases.

14. A driving assistance method using a processor, the method comprising:
acquiring information about a target position decided on as a position relative to another moving object located in a second lane when a host moving object merges or changes lanes from a first lane to the second lane; and
causing a speaker to output a sound obtained by combining a basic sound for acceleration guidance with an additional sound for the acceleration guidance having a higher frequency than the basic sound for the acceleration guidance when the host moving object should accelerate such that position alignment related to a traveling direction of the host moving object is performed with respect to the target position,
wherein the additional sound for the acceleration guidance includes a plurality of sounds having frequencies different from each other.

15. A driving assistance method using a processor, the method comprising:
acquiring information about a target position decided on as a position relative to another moving object located in a second lane when a host moving object merges or changes lanes from a first lane to the second lane; and
causing a speaker to output a sound obtained by combining a basic sound for deceleration guidance with an additional sound for the deceleration guidance having a lower frequency than the basic sound for the deceleration guidance when the host moving object should decelerate such that position alignment related to a traveling direction of the host moving object is performed with respect to the target position,
wherein the additional sound for the deceleration guidance includes a plurality of sounds having frequencies different from each other.

* * * * *